May 20, 1952   B. JORGENSEN   2,597,004
MACHINE FOR USE IN THE MANUFACTURE OF SHOES
Filed Sept. 30, 1946   12 Sheets-Sheet 1

Inventor
Bernhardt Jorgensen
By his Attorney

May 20, 1952     B. JORGENSEN     2,597,004
MACHINE FOR USE IN THE MANUFACTURE OF SHOES
Filed Sept. 30, 1946     12 Sheets-Sheet 2

Inventor
Bernhardt Jorgensen
By his Attorney

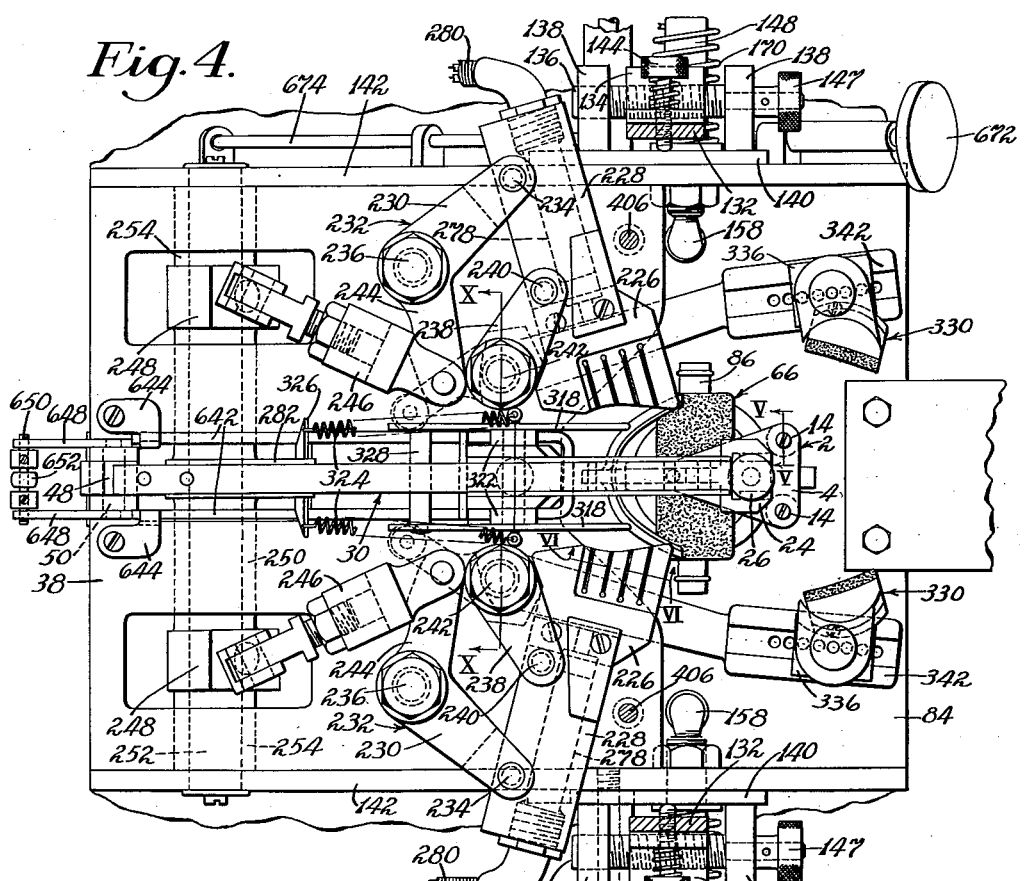

May 20, 1952  B. JORGENSEN  2,597,004
MACHINE FOR USE IN THE MANUFACTURE OF SHOES
Filed Sept. 30, 1946  12 Sheets-Sheet 5
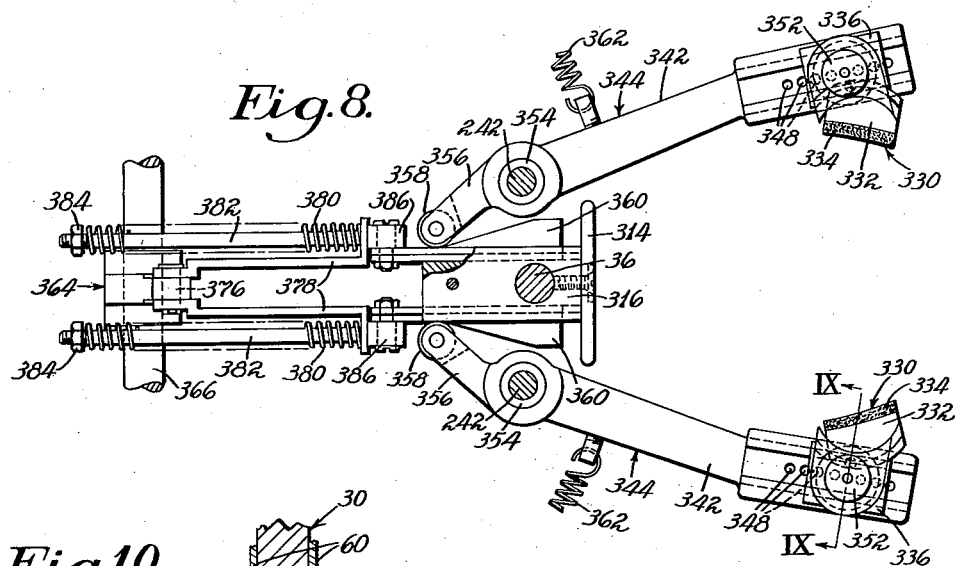
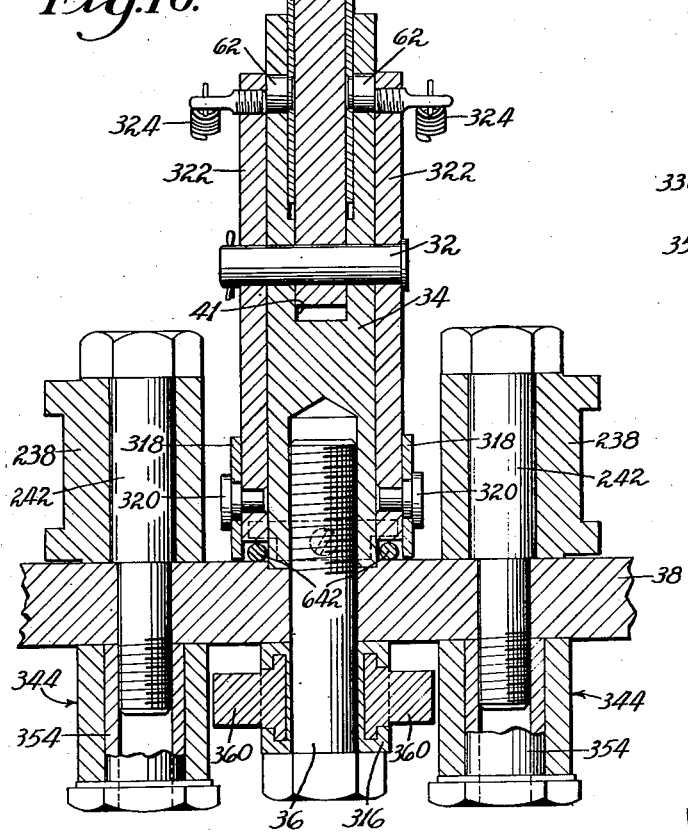
Inventor
Bernhardt Jorgensen
By his Attorney May 20, 1952 B. JORGENSEN 2,597,004
MACHINE FOR USE IN THE MANUFACTURE OF SHOES
Filed Sept. 30, 1946 12 Sheets-Sheet 6

Inventor
Bernhardt Jorgensen
By his Attorney

May 20, 1952     B. JORGENSEN     2,597,004
MACHINE FOR USE IN THE MANUFACTURE OF SHOES
Filed Sept. 30, 1946     12 Sheets-Sheet 7

Inventor
Bernhardt Jorgensen
By his Attorney

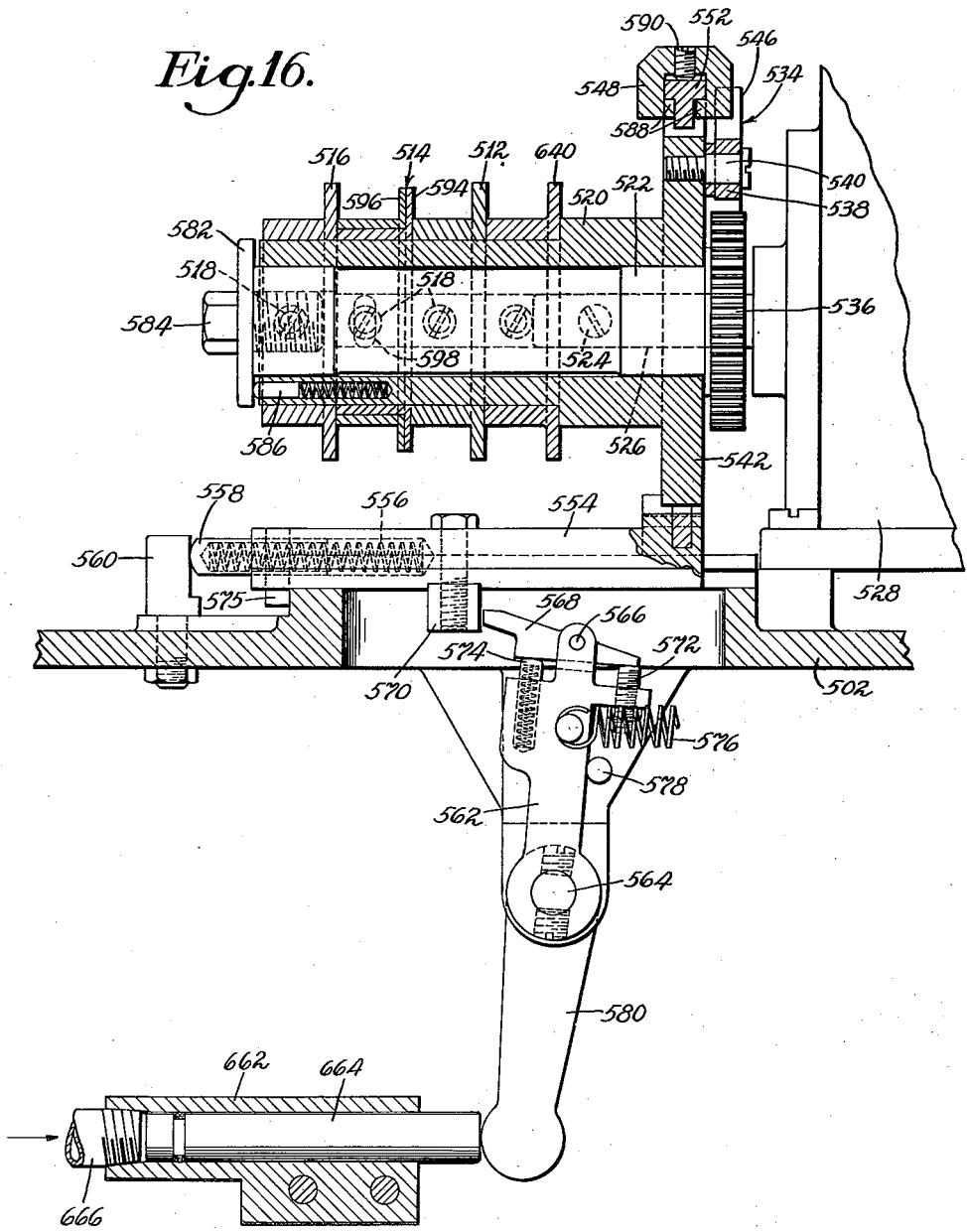

May 20, 1952  B. JORGENSEN  2,597,004
MACHINE FOR USE IN THE MANUFACTURE OF SHOES
Filed Sept. 30, 1946  12 Sheets-Sheet 9

Inventor
Bernhardt Jorgensen
By his Attorney

May 20, 1952     B. JORGENSEN     2,597,004
MACHINE FOR USE IN THE MANUFACTURE OF SHOES
Filed Sept. 30, 1946     12 Sheets-Sheet 10

*Inventor*
Bernhardt Jorgensen
By his Attorney

May 20, 1952 B. JORGENSEN 2,597,004
MACHINE FOR USE IN THE MANUFACTURE OF SHOES
Filed Sept. 30, 1946 12 Sheets-Sheet 12
Fig.24.
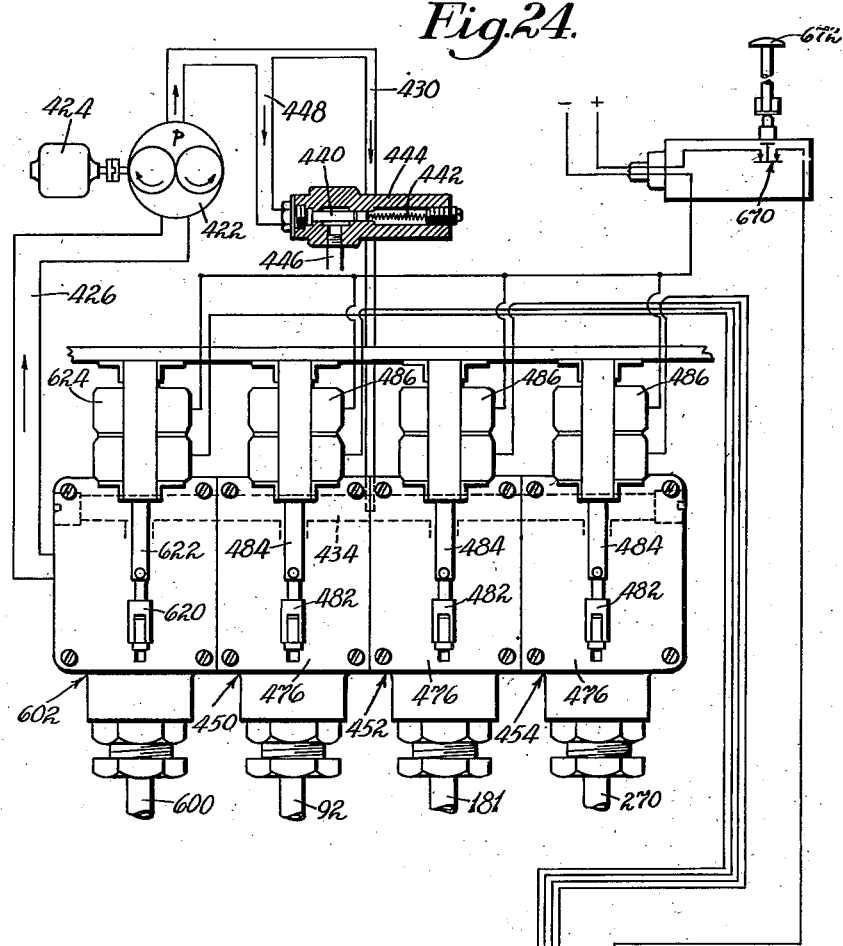
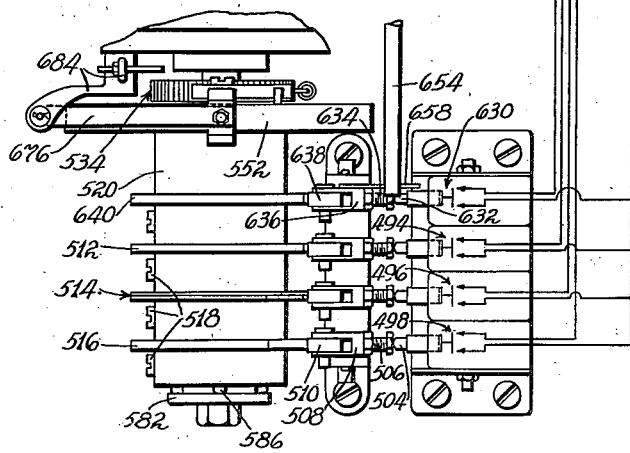
*Inventor*
Bernhardt Jorgensen
By his Attorney Patented May 20, 1952

2,597,004

UNITED STATES PATENT OFFICE 2,597,004

MACHINE FOR USE IN THE MANUFACTURE OF SHOES

Bernhardt Jorgensen, Marblehead, Mass., assignor to United Shoe Machinery Corporation, Flemington, N. J., a corporation of New Jersey Application September 30, 1946, Serial No. 700,267

91 Claims. (Cl. 12—10.5)

This invention relates primarily to machines for use in the manufacture of shoes, although in some aspects it is not limited to machines for operating on work of that particular kind. It is herein illustrated as embodied in a machine for lasting the toes of "open-toe" shoes, i. e., shoes of that type in which the upper is open at the end of the toe, but it will be further recognized that as to some features of the means provided for treating such shoes the invention is not limited in utility to the manufacture of shoes of that special type.

While open-toe shoes are frequently made by a method which involves the securing of the upper permanently to an insole or its equivalent before a last is inserted in the shoe, a substantial proportion of such shoes, especially of the better grades, are made on the last, the upper being subjected to the well-known pulling-over operation prior to what is more distinctively termed the lasting of the shoe. After the pulling-over operation the shoe, in accordance with the customary practice, is lasted along its shank portion and then along the sides of the forepart as far forwardly as the toe portion. Thereafter the toe-lasting operation is performed. To provide a machine for speedily and satisfactorily lasting the toes of such shoes is the primary object of the present invention.

To the above and other ends, the machine herein shown includes grippers which grip the margin of the upper at the opposite sides of the toe respectively and pull the upper heightwise of the last, wipers which thereafter wipe the margin of the upper at the sides of the toe inwardly over an insole on the last, and a toe former which wipes the toe end of the upper heightwise of the last after it has been pulled by the grippers and holds it in conformity to the contour of the last as its margin is wiped inwardly by the wipers. The machine is a fluid-operated machine and the grippers are closed and operated by fluid-pressure means, the construction of the grippers and of their operating means being generally in accordance with the disclosure of Letters Patent No. 2,423,454, granted on July 8, 1947 on an application of mine, which shows grippers operating on other portions of an upper. The wipers, for the purposes in view, are operated and controlled by novel means whereby they are moved bodily toward each other widthwise of the last with components of movement lengthwise of the last in heelward directions, as is especially advantageous in operating on the portions of the upper at the sides of the toe of an open-toe shoe. More particularly, they are each supported by a pair of arms located respectively at different distances from the last and mounted to swing about axes extending heightwise of the last, the wipers accordingly following curved paths in their above-described movements. One of the arms associated with each wiper is part of a lever through which the wiper is operated by a piston common to both wipers. The wipers are so formed and arranged that, for a reason hereinafter explained, the portions thereof which are farthest from the end of the toe first begin their wiping action on the upper, and to afford better insurance that all portions of the margin of the upper acted upon by each wiper will be effectively pressed on the insole, to which the toe portion of the upper is customarily secured by cement in the lasting operation, each wiper includes a plurality of resilient wiping fingers arranged in a series lengthwise of the edge of the shoe bottom.

The above-mentioned toe former, in the construction herein shown, comprises a metal upper-engaging member curved to extend about the toe end of the last and resiliently flexible to permit it to be conformed by pressure to the contour of the last, this member being mounted on a holder which is resiliently flexible in directions lengthwise of the last further to facilitate the application of the desired shaping pressure to the upper. For controlling the toe former there are provided members which are not connected to it but are arranged to bear against it respectively in locations spaced apart widthwise of the last to press it both lengthwise of the last and inwardly toward the sides of the toe, these members being yieldingly forced against the toe former lengthwise of the last each independently of the other at a predetermined time in the operation of the machine. The toe former is moved relatively to these members to wipe the upper heightwise of the last by the above-mentioned wiper-operating piston which is moved heightwise of the last to operate the wipers. The toe former is yieldingly supported by this piston to permit further wiper-operating movement of the latter after the movement of the toe former has been stopped by means provided for that purpose.

To position and hold the shoe in proper relation to the lasting means, the machine is provided with a sole rest arranged to engage the bottom of the forepart of the insole and with a toe rest arranged to engage the top of the forepart of the shoe and to press the shoe against the sole rest. The sole rest is supported on a lever which is mounted to swing in directions heightwise of the shoe but is controlled initially by a latch which holds it against movement when the shoe is pressed against the sole rest by the toe rest. To increase the force with which the margin of the upper is pressed on the bottom face of the insole by the wipers, the latch is operated to release the lever after the wipers have begun to wipe the upper inwardly over the insole, thus permitting the toe rest to press the shoe more forcibly against the wipers. In order to operate in the most satisfactory manner, the wipers are moved so far inwardly that portions of them are substantially or nearly in contact with each other at the end of the wiping operation, and accordingly there is further provided spring means for swinging the above-mentioned lever to carry the sole rest far enough heightwise of the shoe to clear the inwardly moving wipers when it is released by the above-mentioned latch. In the construction shown a member which is movable to cause the latch to release the lever serves thereafter by reverse movement to return the lever into position again to be held by the latch. To render the sole rest more effective in preventing displacement of the shoe in the lasting operation, it is provided with a plurality of insole-engaging members having therein recesses opposite the insole to provide around the recesses edge portions which tend to embed themselves in the insole when it is pressed against them and thus to hold the shoe securely. An advantage of this construction is that if these members engage the insole as the shoe is presented to the machine by the operator they do not oppose any substantial resistance to lengthwise or lateral movement of the shoe in thus presenting it. As herein shown, however, there is further provided guiding means which by engagement with the insole holds it normally out of contact with these sole rest members as the shoe is presented, the guiding means comprising a leaf spring arranged to engage the insole substantially midway between its opposite side edges and yieldable after the shoe has been properly presented to permit the insole to be pressed against the sole rest members.

Further to control the shoe, and especially to prevent its displacement when it is released from control of the sole rest as above described, the machine is provided with clamp members movable into engagement with the opposite sides of the shoe respectively while the shoe is still controlled by the sole rest, these members being arranged to engage the shoe in locations where its sides curve inward heelwardly of the ball line to increase their effectiveness in preventing lengthwise as well as lateral displacement of the shoe. The clamp members are carried by levers which are mounted to swing about axes extending heightwise of the shoe, and they are moved into positions determined by the shoe by wedge members arranged to act respectively on the different levers. The wedge members are yieldingly operated and are relatively movable to permit them to assume positions determined by the positions of the clamp members in engagement with the shoe, and they are so formed that once they have moved the clamp members into shoe-engaging positions they automatically prevent reverse movements of the members.

In addition to novel features involved in the construction thus far briefly outlined, the invention further provides an organization which is novel in various aspects for controlling the power operation of the machine. As previously stated, the machine herein shown is a fluid-operated machine, the operating fluid being preferably light oil delivered to a manifold by a continuously driven pump. From the manifold the fluid under pressure is admitted at the proper times to different servo-motor cylinders by electrically operated valves controlled by cams which are rotatable as a unit to determine a cycle of operations of the machine, the cams being driven through a one-revolution clutch. A valve-controlled outlet permits escape of the fluid delivered by the pump and thereby prevents the development of any substantial fluid pressure when the machine is not operating. In response to presentation of the work to the machine the valve controlling this outlet is closed by electrical means to cause the development of fluid pressure, this action resulting, in the machine herein shown, from pressure of the toe end of the last against the toe former. In response to the development of such fluid pressure the clutch is actuated to start the cycle of operations by a fluid-operated device in constantly open communication with the manifold. Accordingly, the machine is started by fluid-pressure means in response to presentation of the work. It will be understood that as to various novel features of this organization the invention is not limited in utility to machines for performing the particular operations herein disclosed.

The above and other features of the invention, including novel means for optionally stopping the machine prior to the end of the cycle and various novel details of construction and combinations of parts, will now be more particularly described with reference to the accompanying drawings and thereafter pointed out in the claims.

In the drawings,

Fig. 4 is a plan view of the upper portion of the machine with the grippers omitted and with certain parts in section on the line IV—IV of Fig. 2;

Fig. 5 is a section on the line V—V of Fig. 4;

Fig. 6 is a section on the line VI—VI of Fig. 4;

Fig. 7 is a section on the line VII—VII of Fig. 2;

Fig. 8 is mainly a plan view of the means provided for clamping the shoe at its opposite sides;

Fig. 9 is a section on the line IX—IX of Fig. 8;

Fig. 10 is a section on the line X—X of Fig. 4;

Fig. 16 is a section on the line XVI—XVI of Fig. 13;

Fig. 24 is a partly diagrammatic view showing portions of the fluid-pressure system and of the valve-operating and controlling means.

Figure 3:
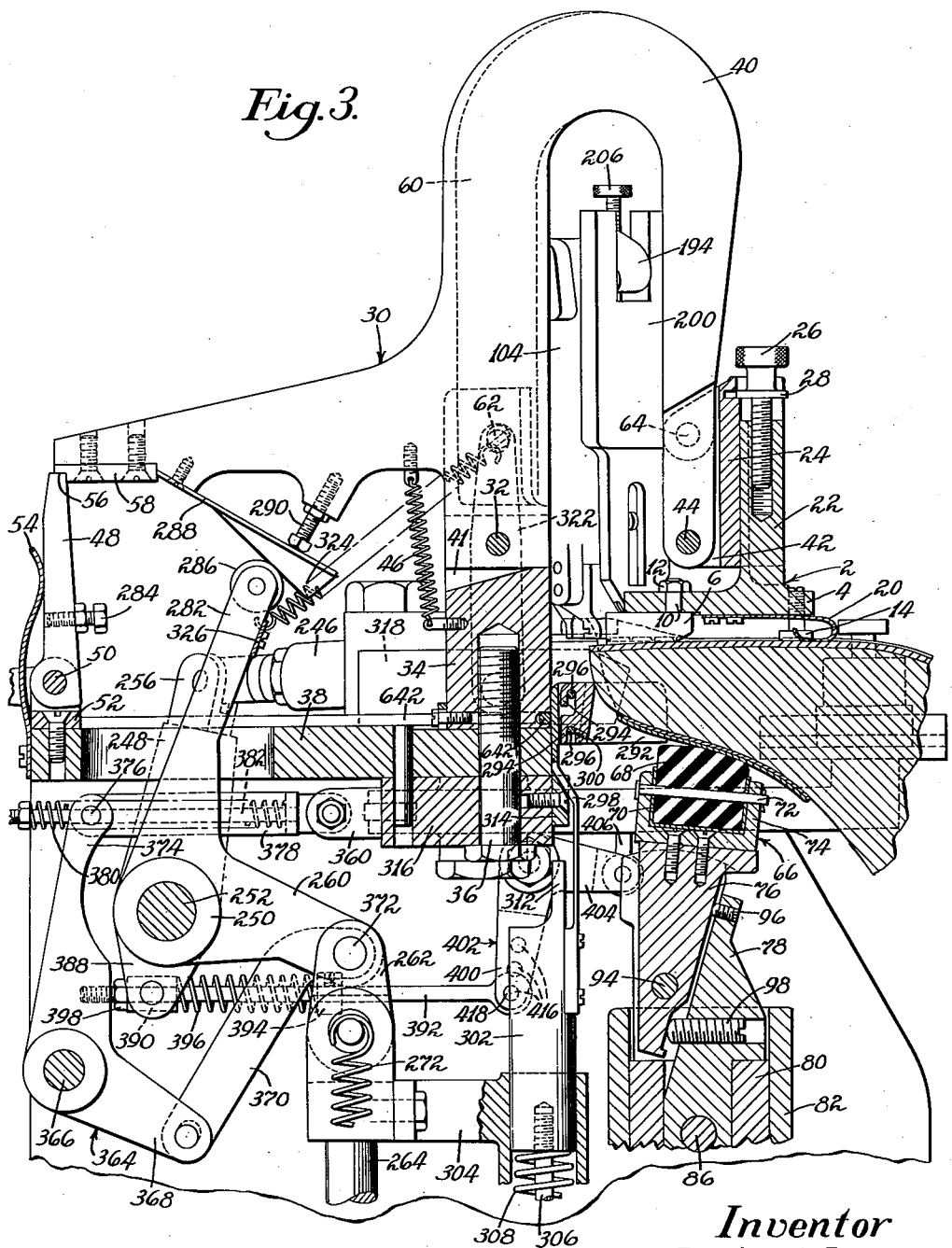
Fig. 3 is a view similar to Fig. 2, but with portions of the structure in central vertical section.

For positioning the shoe heightwise in proper relation to the lasting means the machine is provided with a sole rest 2 (Figs. 3 and 4). This sole rest includes a substantially triangular plate 4 on which is supported a small block 6 arranged to engage the insole near the end of the toe in a location substantially midway between the opposite sides of the toe. This block is mounted in a shallow slot 8 (Fig. 20) in the lower face of the plate 4, and extending from it through the plate is a stem 10 on which is threaded a nut 12 to secure it in place. The block is provided with a smooth insole-engaging face so that it will not interfere with such movement of the shoe as may be necessary in presenting it properly to the machine. Supported by the front-end portion of the triangular plate 4 in locations spaced apart widthwise of the shoe are two other insole-engaging members 14 having stems which are threaded in the plate for adjustment heightwise of the shoe to determine variably the position of the bottom face of the toe-end portion of the shoe. As illustrated in Fig. 5, each of the members 14 has therein a recess 16 opposite the insole to provide around the recess a circular edge portion 18 adapted to embed itself in the insole when the latter is pressed against it and thus to hold the shoe against lengthwise or lateral displacement in the lasting operation. A special advantage of this construction is that the edge portions 18 of the members 14 will not oppose any substantial resistance to lengthwise or lateral movement of the shoe if they engage the insole as the shoe is being presented to the machine. There is further provided, however, means for holding the shoe normally out of contact with the members 14 as it is presented, comprising a leaf spring 20 secured on the lower face of the plate 4 and having a dowwnardly and rearwardly curved portion arranged to engage the insole substantially midway between its opposite side edges in a location substantially between the two members 14. The insole-engaging portion of the spring 20 extends normally below the level of the lower edges of the members 14, and the spring is yieldable to permit the shoe to be pressed up against these members, after it has been properly presented, by means hereinafter described.

Formed on the sole rest plate 4 is an upwardly extending shank portion 22 mounted in a vertical T-slot formed in a holder 24, and threaded in this shank portion is a screw 26 having a flange 28 which extends into slots formed in opposite side portions of the holder, so that by turning the screw the sole rest may be adjusted vertically. The holder 24 is supported on the front end of a lever 30 pivotally mounted between its opposite ends for swinging movements heightwise of the shoe on a stud 32 supported in a block 34 which is held by a screw 36 fast on a top frame plate 38 with which the machine is provided. In order to provide proper clearance for the grippers hereinafter described, the lever 30 has a substantially U-shaped portion 40 one arm of which extends downwardly into a slot 41 in the block 34 and the other arm into a slot 42 (Fig. 3) in the holder 24, this other arm being provided with a stud 44 on which the holder is pivotally mounted. A function of the lever 30 is to raise the sole rest 2 at the proper time in the operation of the machine, both to permit the shoe to be pressed more forcibly up against the wipers (hereinafter described) and also to provide suitable clearance for the wipers in their movements inwardly over the shoe bottom. For this purpose the lever is swung about the stud 32 by a spring 46 when it is released by a latch 48 which normally holds it against such movement. The latch is pivotally mounted on a pin 50 supported by a bracket 52 on the plate 38 and is normally held by a leaf spring 54 in a notch 56 formed in a wear plate 58 fast on the rear end of the lever 30. The means whereby the latch is operated to release the lever will be hereinafter described.

In order to provide sufficient clearance for the wipers between the insole and the sole rest block 6 it is desirable to prevent any tipping movement of the sole rest when it is raised by the lever 30. Further to control the holder 24, therefore, there are provided at the opposite sides of the U-shaped portion 40 of the lever 30 a pair of comparatively thin U-shaped plates 60 the rear arms of which are pivotally mounted near their lower ends on the block 34 by means of stud 62 (Figs. 3 and 10) located directly above the stud 32. The lower ends of the front arms of the plates are pivotally connected to the holder 24 by means of studs 64 located directly over the stud 44 at the same distance from the latter as the distance between the stud 32 and the studs 62. When the sole rest, therefore, is raised by the swinging of the lever 30 the plates 60 have the function of an idle link swinging about the fixed axis of the studs 62 and preventing any substantial tipping movement of the sole rest as it is moved upwardly. In other words, the U-shaped portion of the lever 30 and the pair of plates 60 have virtually a parallel link motion in lifting and controlling the sole rest.

Substantially at the beginning of the cycle of operations of the machine, after the machine has been started in a manner hereinafter described, the shoe is clamped against the sole rest 2 by a toe rest 66 engaging the shoe underneath at the top of the forepart. This toe rest comprises a shoe-engaging rubber block 68 mounted in a holder 70, the block and holder being confined by a pin 72 in an exterior holder 74 secured on the top of a block 76. A portion of this block extends downwardly into a recess provided in another block 78 which is supported on the top of a piston 80 vertically movable in a cylinder 82 mounted on a horizontal frame plate 84. A portion of the block 78 extends downwardly into a recess in the piston and is held therein by a pin 86 extending through the piston and through slots 88 in the walls of the cylinder 82. Springs 90 connected to the opposite ends of this pin hold the piston initially in the position determined by engagement of the pin with the cylinder at the lower ends of the slots 88. At the proper time in the operation of the machine, as more particularly hereinafter described, operating fluid is admitted to the lower end of the cylinder 82 from a pipe line 92 to raise the piston 80 and thus to move the toe rest 66 into position to clamp the shoe against the sole rest 2. The block 76 supporting the toe rest is pivotally mounted on a pin 94 on the block 78 for swinging movements to adjust the toe rest in directions lengthwise of the shoe, such adjustment being effected by screws 96 and 98 threaded in the block 78 and engaging the block 76 in locations above and below the pin 94 respectively.

The first operation performed on the shoe after it has been clamped as above described by the toe rest is the pulling of the upper at the opposite sides of the toe heightwise of the last. For this purpose the machine is provided with a pair of grippers each identified generally by the reference character 100, as shown best in Fig. 19. The construction of these grippers and of the means whereby they are operated is substantially as disclosed in the previously mentioned Letters Patent No. 2,423,454 and accordingly will be herein only briefly described. They are, however, mounted and controlled in some respects differently from that prior disclosure, as will be explained in detail. Each gripper, includes what may be termed an inner of fixed jaw 102 secured to the lower end of a cylinder 104, and another jaw 106 pivotally mounted on a pin 108 for swinging movements toward and from the jaw 102. The jaw 106 is connected by a link 110 to a piston 112 movable downwardly by fluid admitted as hereinafter described to the cylinder 104 to cause the jaws to grip the upper. Each cylinder 104 is secured at its upper end to a block 114 mounted on a slide 116 which is movable along a guideway on a bar 118 to adjust the gripper in directions widthwise of the shoe by means of a screw 120 threaded in the slide and mounted to turn in a bearing formed in an upwardly extending portion of the bar 118. The screw is prevented from moving lengthwise relatively to the bar by a knob 122 fast thereon at one side of the upwardly extending portion of the bar and a nut 124 threaded thereon at the opposite side of this upstanding portion. A tongue 126 curved about an axis extending heightwise of the shoe extends upwardly from the slide 116 into a similarly curved slot in the block 114 to permit adjustment of the block and the gripper about that axis, the block being held in adjusted position by a screw 128 which is threaded in the slide and extends through a slot 130 (Fig. 18) in the block.

In the construction herein shown each bar 118 is secured on a substantially horizontal portion of an angular bracket 132 which extends outwardly widthwise of the machine and then downwardly (Figs. 18 and 19) to a position where it is welded to a member 134 (Figs. 4 and 7) mounted on a horizontal pin 136 rotatable in ears 138 formed on a plate 140 which is supported on the side frame 142 of the machine as hereinafter described. Threaded in the lower end of the bracket 132 and in an upwardly extending portion of the member 134 is a screw 144 the inner end of which is in engagement with the plate 140 and by the turning of which the gripper may be adjusted about the axis of the pin 136 to vary its position heightwise of the shoe. It will be understood that the weight of the gripper and of parts associated therewith serves to maintain it normally in the position determined by the screw 144, and when the gripper is operated as hereinafter described to pull the upper it moves in a direction generally heightwise of the shoe about the axis of the pin. A spring 146 (Fig. 7) mounted between the member 134 and the head of the screw 144 serves to prevent the screw from turning too freely. The portion of the pin 136 located between the ears 138 has thereon a screw thread engaging a corresponding thread in the member 134, and accordingly turning movement of the pin by means of a knob 147 thereon serves to adjust the gripper lengthwise of the shoe. Lengthwise movement of the pin is prevented by engagement of the knob with one side of one of the ears 138 and by engagement of the threaded portion of the pin with the other side of this ear.

Figure 18:
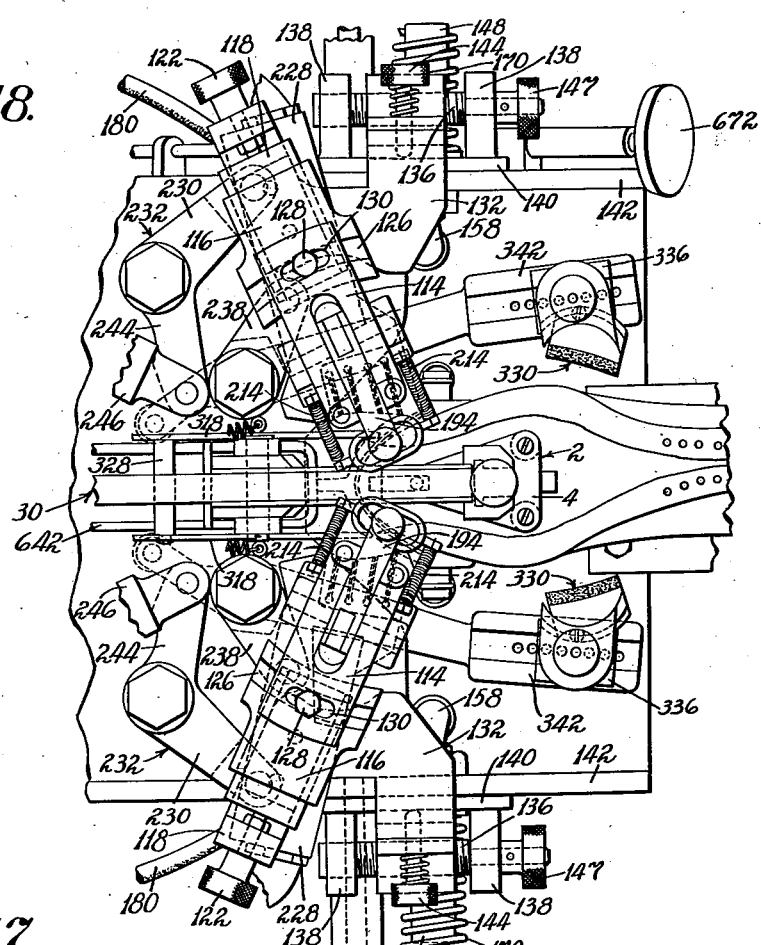
Fig. 18 is a plan view of most of the upper portion of the machine with the parts as they appear in relation to a shoe when the shoe is presented to the machine.
Figure 19:
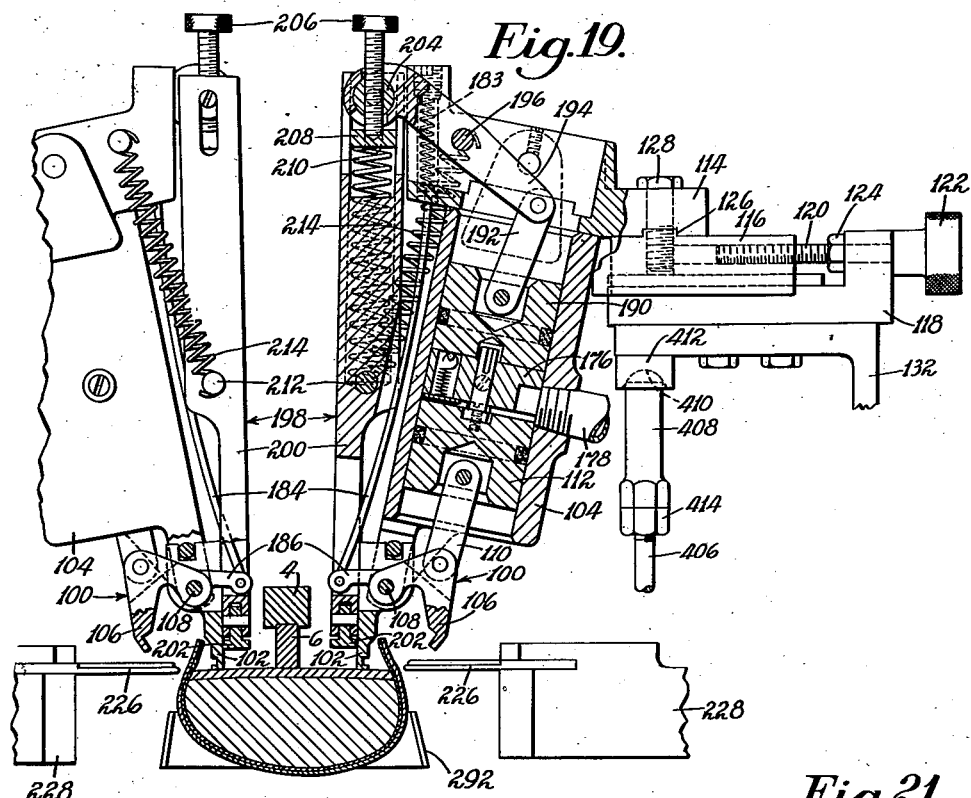
Fig. 19 is a front view, with parts in section, showing mainly the grippers in their initial positions in relation to the shoe.

By reference to Fig. 19 it will be seen that the gripper jaws initially are wide apart to receive the margin of the upper between them when the shoe is presented to the machine. For better insurance that the margin of the upper will be properly received between the jaws without undue attention on the operator's part, the grippers are so positioned initially that their inner or fixed jaws 102 are located substantial distances inwardly from the edge of the insole, the grippers also being so adjusted by the above-mentioned screws 144 that these jaws are substantially in contact with the bottom face of the insole when the shoe is presented, as shown in Fig. 19. Before they grip the upper the grippers are moved in outward directions to positions such that their inner jaws are preferably just beyond the edge of the insole. For this purpose the above-mentioned plates 140 supporting the grippers are mounted for movements in outward directions widthwise of the machine. Each of these plates at its lower end is fast on a cylinder 148 (Figs. 4 and 7) which is movably mounted on a fixed piston 150 extending through an opening in the side frame plate 142. A flange 152 on the piston engages one side of the frame plate, and the piston is held in place by a nut 154 threaded thereon at the opposite side of the plate. Extending through the piston is a bore 156 through which operating fluid is admitted from a pipe 158 to the interior of the cylinder 148, and by the movement of the cylinder the gripper is carried outwardly widthwise of the shoe to the desired position, the plate 140 being further guided in its movement by a pin 160 (Fig. 1) extending from the frame into a slot in the plate. To limit the outward movement of the gripper there is secured to the frame by a screw 162 a bracket 164 a portion of which extends through an opening 166 in the plate 140, and threaded in the bracket is a screw 168 which by engagement with the cylinder 148 adjustably limits the movement of the gripper. The cylinder is operated against the resistance of a spring 170 positioned between the bracket 164 and a flange 172 on the cylinder, and by this spring the gripper is returned when the fluid is released from the cylinder. The two pipes 158 leading to the cylinders 148 (Fig. 18) are in communication with the previously mentioned pipe line 92 leading to the cylinder 82, as indicated in Fig. 1, and accordingly the two grippers are moved outwardly as described simultaneously with the upward movement of the toe rest 66.

Figure 1:
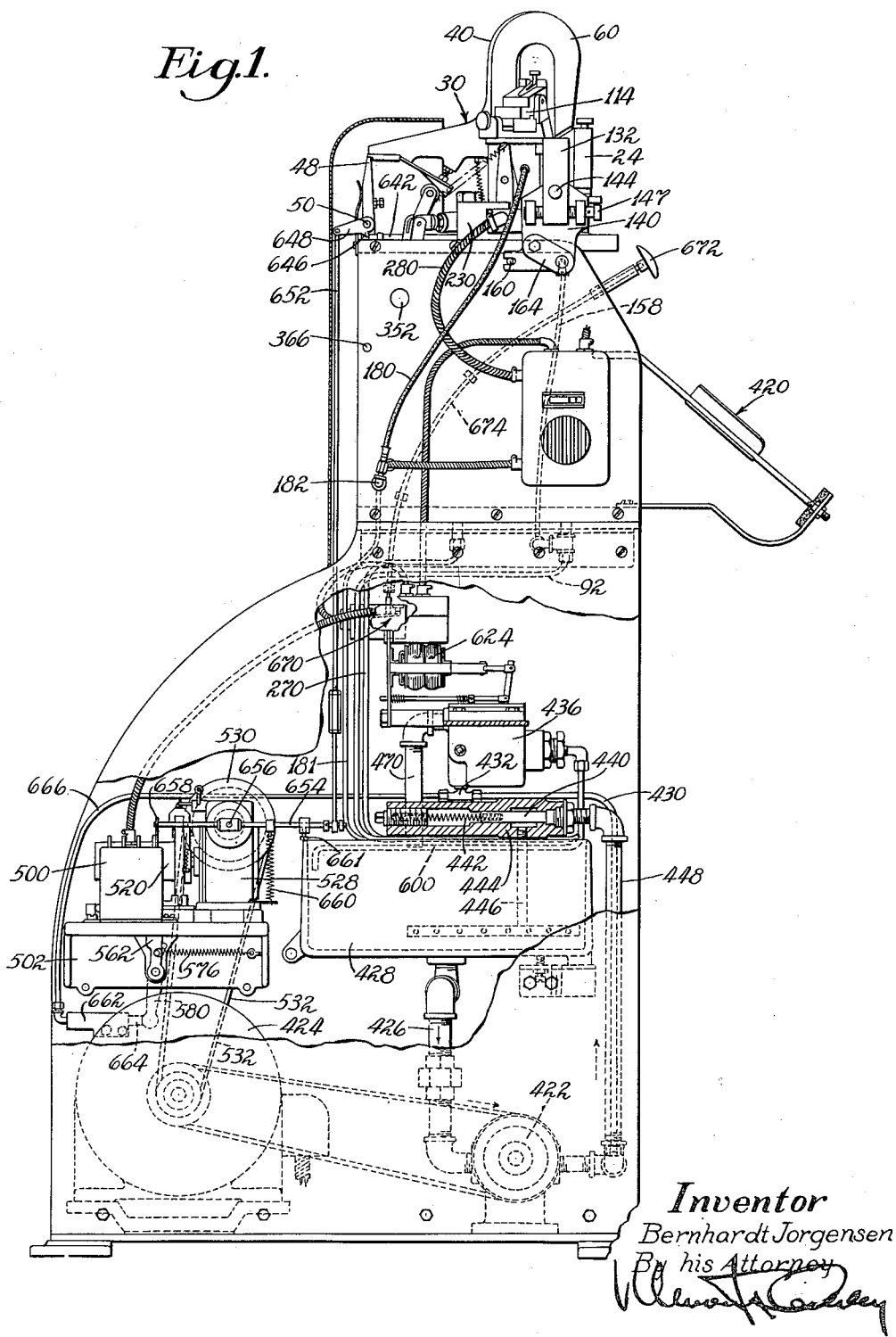
Fig. 1 is a view mainly in left-hand side elevation of the machine in which the invention is herein shown as embodied, with parts broken away.

The movement of the piston 112 of each gripper to cause its jaws to grip the upper is effected by fluid admitted to a chamber 174 (Fig. 20) in the cylinder 104 between the piston and a partition 176 in the cylinder, the fluid being conducted to this chamber through a coupling 178 from a flexible tube 180 (Figs. 1 and 18). The tubes 180 are in communication with a pipe line 181 (Fig. 1) through a cross-pipe 182. As disclosed in detail in the previously mentioned Letters Patent, the swinging movement of the jaw 106 of each gripper to grip the upper is effected against the resistance of two springs 183 (Fig. 19), only one of which is herein shown, these springs being mounted in the block 114 and engaging the bifurcated upper end of a downwardly extending rod 184 pivotally connected to an arm 186 integral with the jaw 106. It will be understood that when the fluid is released from the chamber 174 through the coupling 178 after the pulling of the upper the springs 183 return the jaw 106 and the piston 112.

The pulling of the upper heightwise of the last by each gripper is effected by swinging the cylinder 104, the block 114 and the bracket 132 as a unit about the axis of the pin 136. For this purpose the cylinder is provided with another fluid-receiving chamber 188 (Fig. 20) above the partition 176, and movable in this chamber is a piston 190 connected by a link 192 to one end of a lever 194 which is pivotally mounted substantially midway between its opposite ends on a pin 196 on the block 114. When this piston is moved upwardly by fluid admitted to the chamber 188 it acts through the lever 194 to impart the upward movement to the cylinder 104 and the gripper by a purchase on the bottom of the shoe through a holddown 198. This holddown includes a substantially vertical bar 200 provided at its lower end with a presser foot 202 arranged to engage the margin of the insole. One end of the lever 194 extends into a recess in the upper end of the bar 200 and is provided with a bearing for a pin 204 which is guided by the bar for downward and upward movements. Extending through the pin and through slots in the end of the lever is a screw 206 which bears at its lower end against a crossbar 208 in engagement with the upper ends of two springs 210 in the bar 200, only one of these springs being herein shown. It will thus be seen that the lever 194 acts on the bar 200 through these springs and that after engagement of the presser foot 202 with the insole these springs may yield in response to resistance of the upper to the force of the pull applied thereto by the gripper, this force being variable by adjustment of the screw 206. Connected to a pin 212 extending through the bar 200 are two springs 214 (Figs. 18 and 19) the upper ends of which are connected to the previously mentioned pin 196, these springs tending to lift the holddown 198 and also to swing it laterally toward the gripper about its connection with the lever 194. Initially they hold it spaced above the insole and against the inner side of the gripper jaw 102, as shown in Fig. 19, with the piston 190 in its lowest position against the partition 176. When fluid is admitted to the chamber 188, after the gripper has been moved outwardly over the insole and after it has closed on the upper, the piston 190 in its upward movement first moves the holddown downwardly into engagement with the margin of the insole and thereafter causes the lever 194 to fulcrum on the holddown and thereby to lift the cylinder 104 to cause the gripper to pull the upper (Fig. 20), the upward movement of the piston being limited by its engagement with a portion of the block 114. When the fluid is released from the chamber 188 the springs 214 return the piston 190 and retract the holddown heightwise of the shoe relatively to the gripper.

As also disclosed in the previously mentioned Letters Patent, the operating fluid is admitted to the chamber 188 from the chamber 174 when the piston 112 has substantially completed its movement to cause the gripper to grip the upper. For this purpose a valve member 216 in the form of a rod extends from the piston 112 into a bore 218 in the partition 176, this valve member having in one side thereof near its upper end a slot 220 through which the fluid is admitted to the chamber 188. When the fluid is released from the chamber 174 after the pulling of the upper the fluid in the chamber 188 returns to the chamber 174 through a passage 222 in the partition 176 past a check valve 224. It will be understood that the fluid thus returning to the chamber 174 is permitted to exhaust from this chamber through the coupling 178 as the piston 112 is moving upwardly toward the partition 176.

Figure 2:
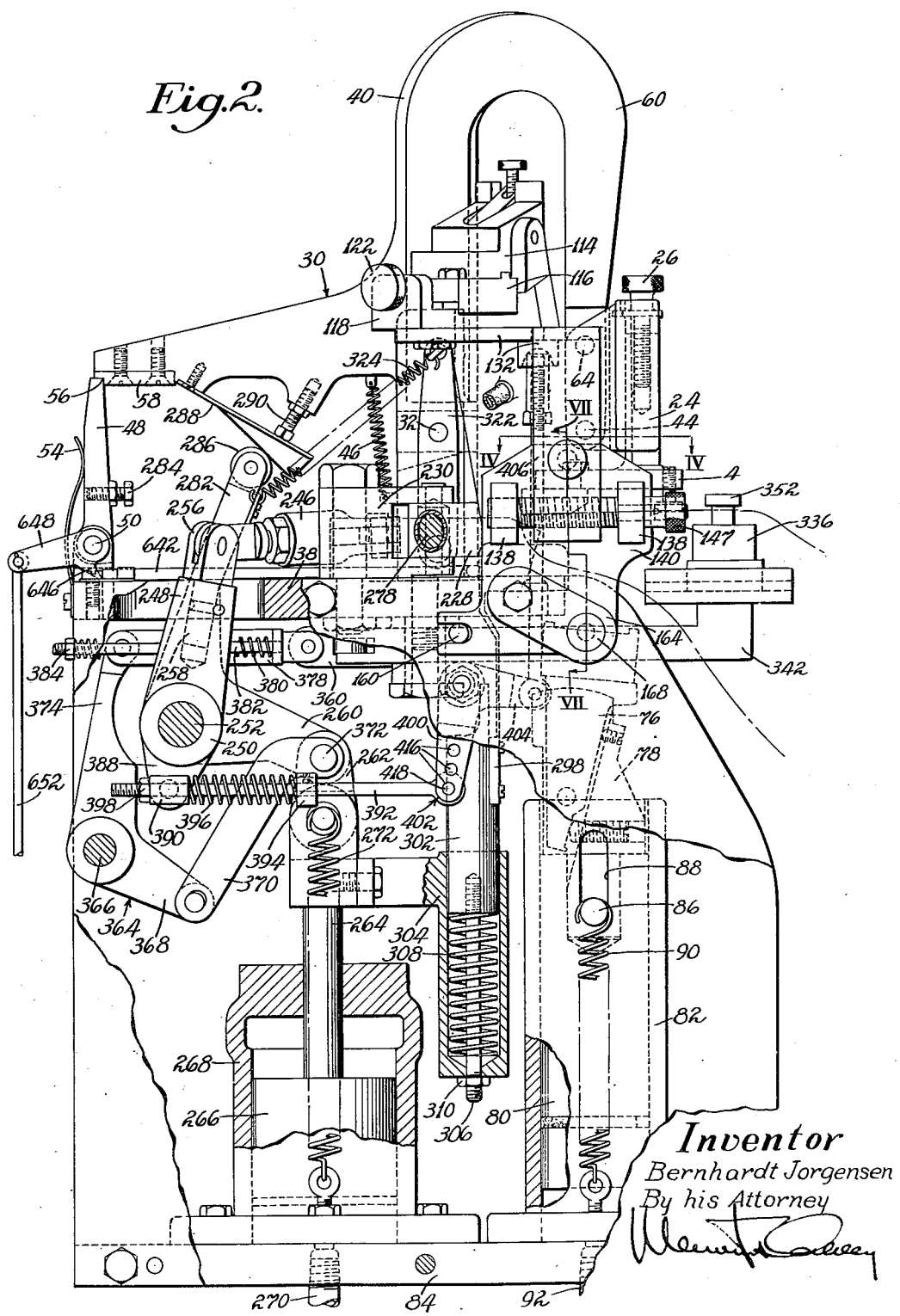
Fig. 2 is a view also mainly in left-hand side elevation, on an enlarged scale, of the upper portion of the machine.

After the pulling of the upper by the grippers its marginal portion is wiped inwardly over the insole at the opposite sides of the toe by a pair of wipers 226 (Fig. 4) secured on wiper carriers 228, the wipers and their carriers constituting what may be termed more generally overlaying devices. Near their outer ends these wiper carriers are supported on forked arms 230 of bell-crank levers 232 to which they are pivotally connected by studs 234, the bell-crank levers being mounted for swinging movements about axes extending heightwise of the shoe on studs 236 supported by the top frame plate 38. In locations nearer the shoe than the arms 230 the wiper carriers 228 are further supported by forked arms 238 to which they are pivotally connected by studs 240, these arms being mounted to swing about axes extending heightwise of the shoe on studs 242 (Fig. 10) supported on the plate 38. By the movements of the arms 230 and 238 the wiper carriers and wipers are carried bodily inward toward each other in the wiping operation, the arrangement being such that the wipers follow curved paths with substantial components of movement lengthwise of the shoe in heelward directions. The wipers are thus operated through the bell-crank levers 232 which have inwardly extending arms 244 connected by adjustably extensible links 246 to upwardly extending arms 248 which are integral with a sleeve 250 mounted to turn on a shaft 252 supported by the side frame plates 142. Mounted on this shaft between the ends of the sleeve 250 and the side frame plates are spacing collars 254. Since the links 246 extend in angular relation to the paths of movement of the arms 248, they are connected to the arms by forked members 256 having shank portions 258 (Fig. 2) which are mounted to turn in the arms. For imparting the operative movements to the arms 248 there is integral with the sleeve 250 an arm 260 (Figs. 2 and 3) connected by a link 262 to the upper end of a piston rod 264 on which is a piston 266 mounted in a cylinder 268 on the frame plate 84. Operating fluid is delivered into the lower end of this cylinder at the proper time from a pipe line 270 (Figs. 1 and 2). The piston is thus moved upwardly against the resistance of a pair of springs 272, only one of which is visible in the drawings, and when the fluid is released from the cylinder these springs serve to return the piston and the wipers.

As will be evident by reference to Fig. 4, the wipers are so formed and arranged that the portion thereof which are farthest from the end of the toe begin their wiping action on the upper prior to the portions located near the end of the toe. An advantage of this is that the wipers begin their action in locations adjacent to portion of the upper which have already been lasted inwardly over the insole beyond the toe, thus affording better insurance against displacement of any portion of the margin of the insole which may be spaced slightly from the bottom face of the last. To afford better insurance also that all portions of the margin of the upper acted upon by each wiper will be effectively pressed on the insole in position to adhere thereto, the wipers have V-shaped slots 274 (Fig. 6) formed therein to provide a plurality of resilient fingers 276 arranged in series lengthwise of the edge of the shoe bottom. In view of the manner in which these slots are formed the upper-engaging faces of the wipers are practically continuous lengthwise of the edge of the shoe bottom. By reference to Fig. 23 it will be seen that when the wipers are at the limits of their inward wiping movements portions thereof which are over the extreme toe end of the shoe bottom are in substantially contiguous relation to each other, the movements of the wipers being limited by engagement of the piston 266 with the upper end of the cylinder 268. To maintain the wipers in a heated condition, as is desirable in lasting with cement, there are mounted in the wiper carriers 228 electrical heating units 278 supplied with current through flexible cables 280.

The means hereinbefore referred to for operating the latch 48 to release the lever 30 consists of an arm 282 (Fig. 3) integral with the sleeve 250 and arranged to engage the head of a screw 284 threaded in the latch when the wipers are nearing the ends of their inward wiping movements. By the action of the spring 46 on the lever, therefore, the sole rest 2 is moved upwardly away from the insole in time to clear the wipers. The arm 282 serves also by its reverse movement to return the lever into position again to be held by the latch 48. For this purpose the arm carries a roll 286 arranged to engage the lower face of an inclined leaf spring 288 which is secured at one end to the lever 30 and is arranged to abut near its other end against the head of a screw 290 threaded in the lever. By adjustment of this screw the spring 288 is so positioned that the lever will be moved just far enough by the arm 282 for the latch 48 to snap into the notch 56 in the plate 58.

To insure that the upper will be closely conformed to the contour of the toe end of the last and will be held so conformed after it has been pulled by the grippers and until its marginal portion has been wiped inwardly over the insole by the wipers, the machine is provided with a toe former 292 (Figs. 3 and 4) consisting of a resiliently flexible upper-engaging metal band curved to extend around the toe end of the shoe. In operating on an open-toe shoe this toe former may engage the end face of the last, as shown in Fig. 3, but it will also engage the portions of the upper at the sides of the toe. On the intermediate portion of the toe former are hook-shaped extensions 294 by which it is supported on a pair of pins 296 mounted in the upper end portion of a holder 298. A setscrew 300 threaded in the toe former and engaging one of the pins retains it in place on the pins. The holder 298 is in the form of a bar which is resiliently flexible in directions lengthwise of the shoe and is secured at its lower end to a cylindrical member 302 mounted in a socket formed in a holder 304 secured to the upper end of the piston rod 264. Extending downwardly from the member 302 through an opening in the lower end of the holder 304 (Fig. 2) is a rod 306, and between the lower end of the member and the bottom of the socket in which it is mounted is a spring 308 which tends to move the member upward relatively to the holder, such upward movement thereof being limited by engagement of a nut 310 on the rod 306 with the lower end of the holder. As shown in Fig. 3, the toe former 292 engages the upper initially in a location spaced a substantial distance heightwise of the shoe from the edge of the insole, and at the beginning of the upward movement of the piston 266 to operate the wipers as hereinbefore described the piston carries the toe former upwardly to wipe the upper heightwise of the last. When the toe former has thus been moved upwardly to the edge of the insole its movement is stopped by engagement of a finger 312 on the member 302 with a small plate 314 which is fast on a block 316 secured on the lower face of the frame plate 38 by the previously mentioned screw 36 (Fig. 10). After the upward movement of the toe former has thus been stopped the spring 308 yields to permit further upward movement of the piston 266 in operating the wipers. The relation of the means for thus operating the toe former to the wiper-operating mechanism is such that the movement of the toe former is completed (Fig. 21) before the wipers have moved far enough to begin the actual wiping of the upper over the bottom face of the insole.

To cause the toe former 292 to apply adequate pressure to the upper at the sides of the toe there are provided two bars 318 (Figs. 4 and 10) located just above the top frame plate 38 and arranged to extend lengthwise of the shoe with their front ends in positions to engage the toe former in locations spaced a substantial distance apart widthwise of the shoe. Between their opposite ends these bars are pivotally connected by studs 320 to the lower ends of upwardly extending levers 322 pivotally mounted between their upper and lower ends on the previously mentioned stud 32 for swinging movements lengthwise of the shoe independently of each other. The upper ends of the levers are connected by springs 324 to the opposite ends of a plate 326 fast on the previously mentioned arm 282. As this arm, therefore, is swung rearwardly in the manner hereinbefore described it acts through the springs 324 on the levers 322 to force the front ends of the bars 318 yieldingly against the toe former in directions lengthwise of the shoe and thereby to flex the portions thereof at the sides of the toe inwardly toward the last while also urging the toe former as a whole in a direction lengthwise of the last. It will be understood that in wiping the upper heightwise of the last the toe former is moved upward relatively to these bars which are pressing against it, the rear ends of the bars resting on the plate 38. Between the rear end portions of the bars is a brace consisting of a pin 328 secured to one of the bars and bearing against the inner face of the other bar to assist in preventing relative movement of the bars widthwise of the last. Initially the springs 324 are fully contracted, so that the bars 318 apply no pressure to the toe former at the time when the shoe is presented to the machine, the levers 322 and the bars being returned through these springs when the arm 282 receives its return movement.

To assist in preventing displacement of the shoe after it has been released from control of the sole rest 2, before the wipers have completed their wiping movements, the machine is provided with a pair of clamp members 330 (Fig. 8) arranged to engage the opposite sides of the shoe in locations where its sides curve inward heelwardly of the ball line (Fig. 23) to hold it against lengthwise as well as lateral displacement. Each of these members comprises a block 332 on which is a shoe-engaging pad 334, this block being supported on another block 336 and being guided by the latter for turning movement about an axis extending heightwise of the shoe to permit it to adjust itself to the shoe. A screw 338 (Fig. 9) threaded in the block 336 extends into a slot 340 in the block 332 to limit turning movement of the latter. Each block 336 is supported on a forwardly extending arm 342 of a lever 344 and is adjustable in directions lengthwise of the shoe along a guideway on this arm. The block is held in adjusted position by means of a pin 346 the lower end of which is arranged to enter any one of a plurality of holes 348 in the arm 342, the pin being movable to release the block against the resistance of a spring 350 by means of a knob 352 on its upper end.

The levers 344 are mounted between their ends on thimbles 354 which are threaded on the lower ends of the previously mentioned studs 242 below the plate 38 (Fig. 10). A rearwardly extending arm 356 of each lever carries a roll 358 arranged to engage a wedge member 360 movable in directions lengthwise of the shoe along a guideway formed in the previously mentioned block 316. Springs 362 connected to the levers 344 tend to swing their forwardly extending arms 342 away from the shoe and hold the rolls 358 at all times in engagement with the wedge members. It will be understood that movements of the wedge members in rearward directions serve to swing the levers 344 in the directions to apply the clamp members 330 to the shoe. For thus moving the wedge members there is provided a bell-crank lever 364 (Figs. 3 and 8) mounted to swing about a shaft 366, one arm 368 of this lever being connected by a pair of links 370 (Figs. 2 and 3) to a pin 372 which serves as a connection between the previously mentioned arm 260 and the link 262. The other arm 374 of the bell-crank lever is connected by a pin 376 to the rear ends of a pair of angular bars 378 the front ends of which are in abutting engagement with springs 380 mounted on rods 382 which are pivotally connected at their front ends to the rear ends of the wedge members 360. These rods extend through openings in the front ends of the bars 378 and are provided on their rear ends with nuts 384 serving as abutments for the rear ends of the springs. It will thus be seen that when the arm 374 of the bell-crank lever 364 is swung in a rearward direction by the upward movement of the piston 266 it acts through the springs 380 to operate the wedge members 360 and thereby to apply the clamp members 330 to the shoe. The clamp members thus assume positions determined by the shoe, the wedge members being relatively movable to permit them to assume positions determined by the clamp members in engagement with the shoe. The wedge members are, moreover, so formed that once the clamp members have been moved into shoe-engaging positions they are positively locked in those positions, since any pressure of the rolls 358 on the wedge members is not sufficient to displace these members against the resistance of the springs 380. The above-described connections between the wedge members and the piston rod 264 are so constructed and arranged that by the upward movement of the piston rod the clamp members 330 are applied to the shoe before the arm 282 has moved far enough to cause the latch 48 to release the lever 30 controlling the sole rest, after which the springs 380 yield in response to the further movement of the piston rod. In the return of the parts to starting positions the wedge members are returned in response to engagement of the front end portions of the bars 378 with heads 386 formed on the front ends of the rods 382. If the machine is operated without any shoe therein the previously mentioned plate 314 serves by engagement with the levers 344 to limit the movements of these levers.

When the fluid is released from the gripper cylinders 104 and the grippers accordingly releases the upper they would, if not prevented, move downwardly toward their starting positions and thus engage the wipers 226 when the wipers are over the insole. To avoid such interference between the grippers and the wipers there is provided means for not only preventing downward movements of the grippers at this time, but for moving them farther upwardly away from the wipers and the wiper carriers. For this purpose the previously mentioned sleeve 250 has formed thereon two short downwardly extending arms 388 (Figs. 2 and 3) pivotally supported on which are sleeves 390 mounted on rods 392. Between the sleeves 390 and collars 394 fast on the rods are springs 396, and threaded on the rear ends of the rods for engagement with the sleeves are nuts 398. The front ends of the rods 392 are pivotally connected to downwardly extending arms 400 of bell-crank levers 402 pivotally supported under the plate 38, and forwardly extending arms 404 of these bell-crank levers are pivotally connected to the lower ends of rods 406 which, as shown in Fig. 4, extend upwardly through guide holes in the frame plate 38. Threaded on the upper end of each rod 406 is a nipple 408 (Fig. 19) having a convex upper end arranged to engage a concave seat 410 formed in a block 412 fast on the corresponding gripper-supporting bracket 132. A lock nut 414 on each rod holds the nipple in adjusted position. In response, therefore, to upward movement of the piston rod 264 the arms 388 act through the springs 396 to impart upward movements to the rods 406 and thus to cause these rods to swing the grippers still farther upwardly upon their release of the upper. It will be understood that when the grippers pull the upper the blocks 412 are carried slightly away from the nipples 408 and that the rods 406 carry the nipples again into engagement with these blocks before they act on the grippers as above described. The downwardly extending arm 400 of each bell-crank lever 402 has therein a plurality of holes 416 in any one of which a pin 418 connecting the arm to the rod 392 may be inserted to vary the amount of movement imparted to the rods 406 by the arms 388.

To relieve the operator of the necessity of holding the shoe in order to prevent it from falling on the floor when it is released after the lasting operation, the machine is provided with a shoe receiver 420 (Fig. 1) upon which the shoe will fall when it is thus released, the shoe receiver being arranged to support the shoe bottom upward in an inclined position. Since the construction of this shoe receiver is substantially as disclosed in the previously mentioned Letters Patent, it will not be herein described in detail.

Figure 11:
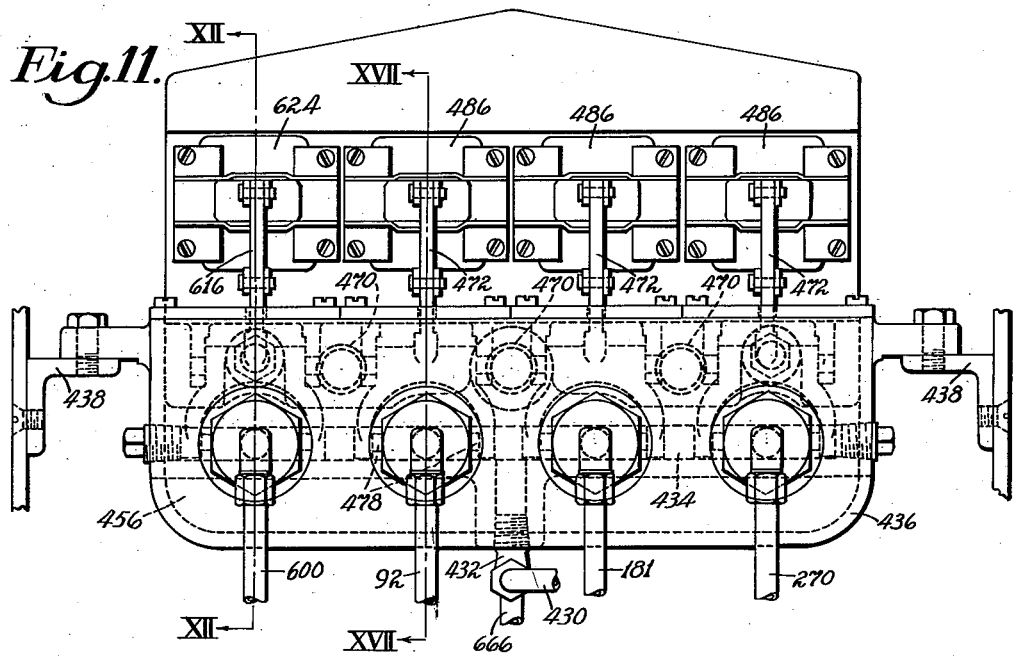
Fig. 11 is a view in front elevation of the valve-operating mechanism and of parts associated therewith.

The fluid-pressure system of the machine includes a pump 422 (Figs. 1 and 24) driven continuously by an electric motor 424 and receiving fluid, preferably light oil, through a pipe line 426 from an open reservoir or sump 428. The pump forces the fluid through a pipe 430 and a coupling 432 into a manifold 434 (Figs. 11, 12 and 24) comprising a bore formed in a casting 436 supported by bracket 438 (Fig. 11) on the frame. When the machine is in operation the fluid is thus maintained under pressure in the manifold 434. To dispose of the excess fluid under those conditions and to limit the maximum pressure of the fluid, there is provided a relief valve 440 (Fig. 1) movable by the fluid against the resistance of an adjustable spring 442 in a casing 444 on the top of the sump 428 to permit escape of the excess fluid through a by-pass 446 to the sump. Fluid is conducted to the valve casing 444 through a pipe 448.

Figure 17:
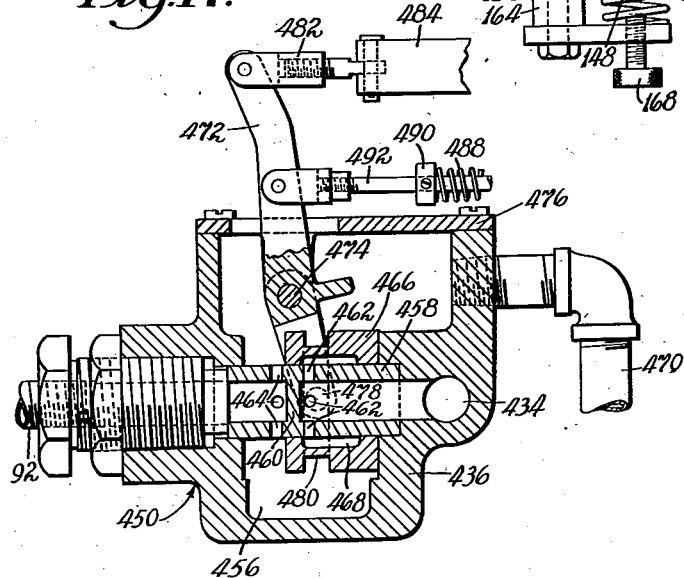
Fig. 17 is a section on the line XVII—XVII of Fig. 11.

The pipe lines 92, 181 and 270 which conduct the operating fluid respectively to the cylinder 82 associated with the toe rest, the gripper cylinders 104, and the cylinder 268 associated with the wipers and other parts lead from the casting 436 (Fig. 11), and associated respectively with these different pipe lines are valve units identified generally by the reference characters 450, 452 and 454 (Fig. 24). These valve units are all of the same construction, and accordingly a description of the unit 450 shown in Fig. 17 will suffice for all of them. Mounted in a chamber 456 in the casting 436, which chamber is common to all the units, is a tube 458 in communication at one end with the manifold 434 and at the other end with the pipe line 92, the tube being divided between its opposite ends by a partition 460. At one side of this partition the tube has extending laterally through it a plurality of ports 462 and at the other side of the partition a plurality of ports 464. Slidingly mounted on the tube is a sleeve valve 466 having therein an annular recess 468 arranged, when the valve is in one position, to afford communication between the ports 462 and 464 and thus to admit fluid from the manifold to the pipe line 92. When the valve, however, is in its initial position, as shown in Fig. 17, communication between the manifold and the pipe line 92 is interrupted and the pipe line is in communication through the ports 464 with the chamber 456. It will be understood, therefore, that when the valve is returned to its initial position after having admitted fluid to the pipe line 92 fluid from the pipe line is permitted to exhaust into the chamber 456 in response to the return movement of the piston 80 by the springs 90. Fluid under atmospheric pressure in the chamber 456 is returned to the sump through pipes 470 (Figs. 11 and 17) leading out of the upper portion of the chamber. The valve 466 is controlled by a lever 472 pivotally mounted at 474 in the chamber 456 and extending upwardly through an opening in a cover plate 476 over the chamber, the lever being provided at its lower forked end with pins 478 lying in a groove 480 in the valve. The upper end of the lever is connected by a link 482 with the core 484 of a solenoid 486. When the solenoid is energized by closing its electrical circuit it therefore moves the valve 466 from its initial position into position to admit fluid from the manifold to the pipe line 92. When the solenoid is deenergized by breaking the circuit the valve is returned to its initial position by a spring 488 engaging a collar 490 fast on a rod 492 which is pivotally connected to the lever 472.

Figure 13:
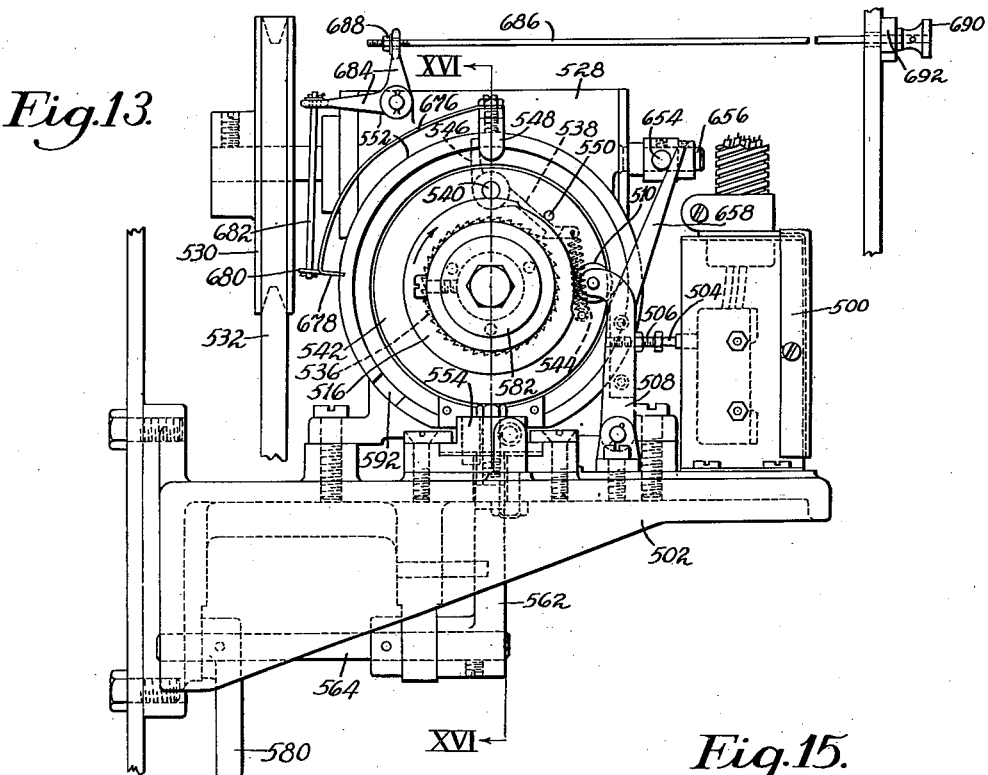
Fig. 13 is a view in rear elevation of the means for controlling the electrical operation of the valves.

From the above description of the valve unit 450 the functions of the valves of the other valve units 452 and 454 in admitting operating fluid respectively to the gripper-operating cylinders 104 and to the cylinder 268 and in releasing the fluid from these cylinders will be readily understood, the corresponding parts of the several valve units, in so far as they are visible, being identified by the same reference characters. Associated respectively with the solenoids of the three valve units 450, 452 and 454 are switches 494, 496 and 498 shown diagrammatically in Fig. 24 for closing and opening the electrical circuits of the solenoids, these switches being mounted in a switch box 500 supported on a bracket 502 (Fig. 13) which is fast on the frame of the machine. Each switch includes a member 504 movable inwardly to close the switch and reversely movable by a spring (not shown) to open the switch. Each member 504 is engaged on its outer end and is moved inwardly by the head of a screw 506 carried by an arm 508 which is pivotally supported at its lower end by the bracket 502 and is provided on its upper end with a roll 510. The rolls on the arms which are associated respectively with the switches 494, 496 and 498 are engaged respectively by cams 512, 514 and 516 secured by screws 518 to a drum 520 rotatable intermittently, as will presently be described. This drum is mounted on a sleeve 522 (Fig. 16) secured by a screw 524 to a shaft 526 which is mounted in bearings in a casing 528 on the bracket 502 and is continuously rotated through gearing (not shown) in this casing by a pulley 530 driven through a belt 532 by the electric motor 424 (Fig. 1). The drum 520 is rotated by the shaft 526 through a one-revolution clutch 534. This clutch includes a ratchet wheel 536 (Figs. 13 and 16) fast on the shaft and a pawl 538 pivotally mounted on a stud 540 carried by a flange 542 on the drum 520. A spring 544 connected to the pawl and to the flange 542 tends to swing the pawl into position to be engaged by the teeth of the ratchet wheel to cause the drum 520 to be driven by the shaft 526. Initially, however, a tail 546 on the pawl is engaged by a stop 548 to hold the pawl out of engagement with the ratchet wheel and in engagement with a pin 550 on the flange 542. The stop 548 is secured to a ring 552 which encircles the flange 542 and is secured below the flange to a slide 554 movable in directions lengthwise of the drum 520 along a guideway on the bracket 502. To actuate or trip the clutch the slide 554 is moved toward the left with reference to Fig. 16 to withdraw the stop 548 from engagement with the tail 546 of the pawl and thus to permit the pawl to be swung by the spring 544 into engagement with the ratchet wheel 536. The slide is thus movable against the resistance of a spring 556 which is mounted in a socket in the slide and presses through a plunger 558 on a member 560 fast on the bracket 502. For thus operating the slide there is provided an arm 562 (Figs. 13 and 16) fast on a rockshaft 564 mounted in bearings on the bracket 502, this arm having pivotally mounted at 566 on its upper end a pawl 568 arranged to engage a block 570 fast on the slide 554. The position of the pawl with respect to turning movement about its axis on the arm 562 is adjustably determined by a screw 572 threaded in the arm and by a spring-pressed plunger 574 which holds the pawl in engagement with the screw. When the arm 562 is swung in a counterclockwise direction with reference to Fig. 16 it acts through the pawl 568 to impart the clutch-tripping movement to the slide 554, the arm being swung far enough to carry the pawl past the block 570 and thus to release the slide which is then returned by the spring 556 to bring the stop 548 into position to disconnect the drum 520 from the shaft 526 at the end of one revolution of the drum. To limit its return movement the slide carries a pin 575 arranged to engage a shoulder on the bracket 502. Thereafter the arm 562 is returned by a spring 576 to its initial position determined by its engagement with a pin 578, the pawl 568 slipping past the block 570. For imparting the clutch-tripping movement to the arm 562 there is fast on the rockshaft 564 a downwardly extending arm 580 operated by means hereinafter described.

Figure 15:
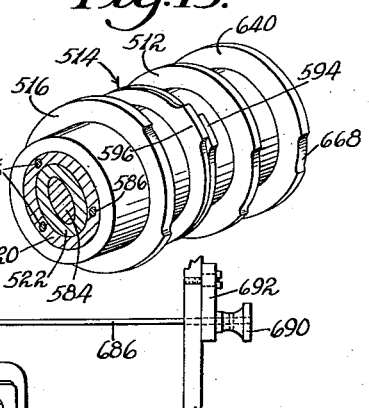
Fig. 15 is a perspective view of cams shown in Fig. 14.

When the drum 520 is disconnected by the clutch from the shaft 526 it is prevented positively by engagement of the stop 548 with the tail 546 of the pawl 538 from moving beyond its predetermined stopping position, since the pawl is engaged by the pin 550 on the flange of the drum. It will, however, be evident by reference to Fig. 13 that the spring 544 has a tendency to swing the pawl away from the pin toward the ratchet wheel 536 with an accompanying reverse turning movement of the drum by reason of the action of the pawl on the stop 548. In order to prevent such chattering as would result if the pawl should thus engage the moving ratchet wheel when the machine is not operating, there is provided a disk 582 formed on a screw 584 which is threaded in the outer end of the sleeve 522, and in engagement with this disk are three spring-pressed plungers 586 (Figs. 15 and 16) mounted in the drum 520. Since the disk is rotated continuously with the shaft 526 its frictional engagement with these plungers tends to turn the drum when the machine is not operating in the same direction in which it is moved by the clutch and therefore overcomes any tendency of the spring 544 to move it reversely, thus insuring that the pawl 538 will remain in engagement with the pin 550 in the position in which it is clear of the ratchet wheel.

The stop 548 (Fig. 16) is in the form of a yoke having inwardly extending projections 588 engaging the inner faces of laterally extending flanges on the sides of the ring 552, and the stop is secured in the proper position on the ring by a setscrew 590 threaded therein. To permit the stop to be mounted on the ring there is provided in each of the laterally extending flanges on the ring a notch 592 to receive the corresponding projection 588 on the stop, one of these notches being shown in Fig. 13.

It will be understood that a cycle of operations of the machine corresponds to one revolution of the drum 520. It will also be understood that the switches 494, 496 and 498 are held closed by the high portions of the corresponding cams (Fig. 15) and are permitted to open when the low portions of the cams are opposite the rolls 510 on the corresponding switch-controlling arms 508. In order to permit the time when the grippers release the upper to be adjustably varied, so that under all conditions there will be the desired time relation between such release of the upper and the action of the wipers on the upper, the cam 514 which controls the flow of fluid to and from the gripper cylinders is made in two parts 594 and 596 both secured to the drum 520 by the corresponding screw 518, the part 596, however, having therein a slot 598 (Fig. 16) through which the screw extends and by reason of which this part may be adjusted about the axis of the drum relatively to the other part. Accordingly the high portion of the cam 514 may be lengthened or shortened in such manner as to vary the time when the switch 496 is opened to cause the grippers to release the upper.

Figure 12:
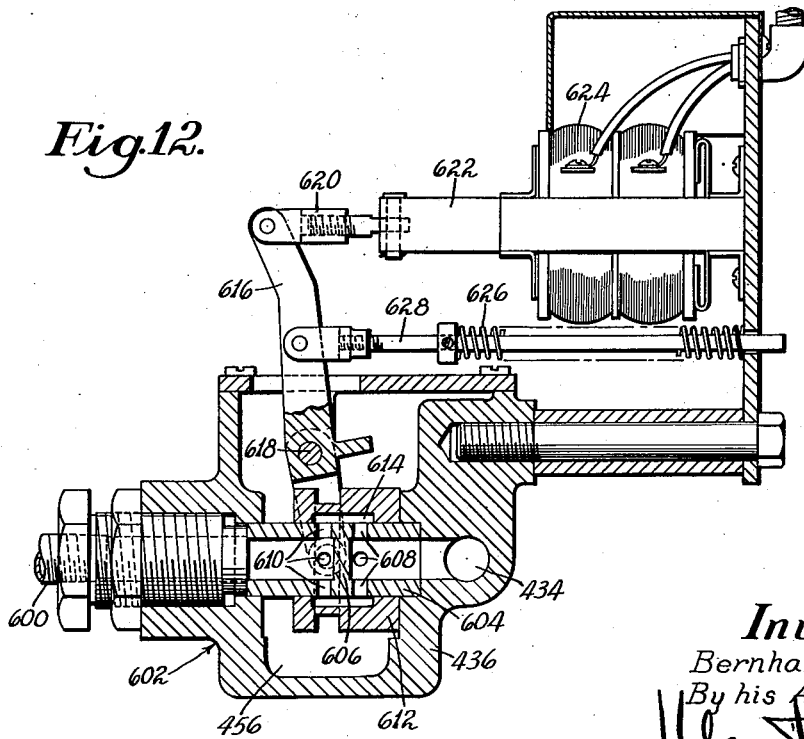
Fig. 12 is mainly a section on the line XII—XII of Fig. 11.
Figure 14:
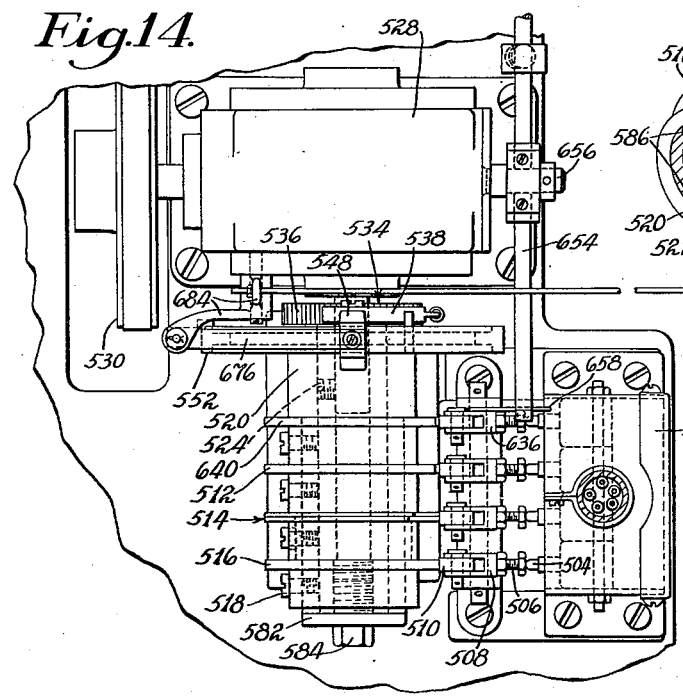
Fig. 14 is a plan view of the structure shown in Fig. 13.

In order to save power when the machine is idle the fluid is permitted at that time to return from the manifold 434 to the sump through a pipe line 600 (Fig. 1) without the development of any substantial pressure in the manifold. For controlling this outlet from the manifold there is provided a valve unit 602 (Figs. 12 and 24) the construction of which is generally similar to that of the other valve units hereinbefore described. In view, however, of the fact that this valve unit performs a different function and is slightly different from the other valve units, its parts are identified by different reference characters. As shown in Fig. 12, a tube 604 having a partition 606 therein is in communication at one end with the manifold 434 and at the other end with the pipe line 600. Extending through the tube at one side of the partition are ports 608 and at the other side of the partition ports 610. A sleeve valve 612 slidingly mounted on the tube has an annular recess 614 which, when the valve is in its initial position, as shown, affords communication between the ports 608 and 610 and thus permits the fluid to escape freely from the manifold. The valve is connected to the lower end of a lever 616 pivotally mounted at 618 in the chamber 456 and connected at its upper end by a link 620 to the core 622 of a solenoid 624. The valve is held in its initial position by a spring 626 acting on a rod 628 connected to the lever 616. It will be understood that when the circuit of the solenoid 624 is closed the valve 612 is moved into position to cover the ports 608 and thus to close the outlet from the manifold, so that pressure will be developed in the manifold by the pump 422. For thus closing the circuit of the solenoid 624 there is provided a switch 630 (Fig. 24) in the switch box 500. This switch, like the other previously mentioned switches in the switch box, includes a member 632 movable inwardly to close the switch and reversely movable by a spring (not shown) to open the switch, the member 632 being engaged by the head of a screw 634 carried by a pivotally mounted arm 636 like the previously described arms 508. On the upper end of the arm 636 is a roll 638 engaged by a cam 640 fast on the drum 520. The switch 630, however, is not closed by the cam 640, but by mechanism operating in response to presentation of the shoe to the machine. This mechanism includes a U-shaped rod 642 (Figs. 4 and 10) resting on the top frame plate 38 and guided for movements in directions lengthwise of the shoe by the block 34 and by clips 644 on the frame plate. The intermediate portion of this U-shaped rod is in position to be engaged by the upper end portion of the flexible holder 298 which supports the toe former 292, as shown in Fig. 3. When a shoe is presented to the machine by the operator pressure of the toe end of the last against the toe former moves the latter a short distance rearwardly as permitted by the flexibility of its holder 298, such movement being limited by engagement of the upper end portion of the holder with the plate 38 and the block 34. In this manner rearward movement is imparted to the U-shaped rod 642. The ends of this rod as it is thus moved rearwardly engage lugs 646 formed on arms 648 which are mounted to swing about the axis of the previously mentioned pin 50 and impart upward swinging movements to these arms, one of the lugs 646 being visible in Figs. 1 and 2. The two arms (Fig. 4) are connected together by a pin 650 on which is pivotally mounted the upper end of a rod 652 connected at its lower end (Fig. 1) to one arm of a lever 654, this lever being pivotally mounted between its opposite ends (Fig. 14) on a pin 656 extending from the previously mentiond casing 528. The other arm of the lever is arranged to engage an upwardly inclined bar 658 (Fig. 13) fast on the previously mentioned arm 636 associated with the switch 630. When the lever 654, therefore, is operated, against the resistance of a spring 660 (Fig. 1), by the upward movement of the rod 652 it acts on the bar 658 to swing the arm 636 in the direction to close the switch 630, thus causing the valve 612 (Fig. 12) to be moved into position to close the outlet from the manifold 434 to cause pressure to be developed in the manifold. Return movement of the lever 654 thereafter is limited by engagement of a screw 661 thereon with the sump casting 428.

In response to the development of fluid pressure in the manner above described the clutch 534 is actuated to start the cycle of operations of the machine. For this purpose there is fast on the frame of the machine (Figs. 1 and 16) a cylinder 662 having therein a piston 664 arranged to engage and operate the previously mentioned clutch-tripping arm 580. Through a pipe 666 the cylinder 662 is at all times in open communication with the previously mentioned coupling 432 through which the fluid is delivered to the manifold by the pump and accordingly the piston 664 is immediately responsive to the development of pressure when the switch 630 is closed. Immediately after the starting of the drum 520 the high portion of the cam 640 engages the roll 638 and serves thereafter to hold the switch 630 closed throughout the cycle of operations regardless of any possible slight displacement of the shoe. At the end of the cycle of operations a depression 668 (Fig. 15) in the cam arrives in a position opposite the roll 638, thus permitting the switch 630 again to open, whereupon the valve 612 (Fig. 12) is returned to its initial position to terminate the pressure in the manifold. The clutch-tripping arms 562 and 580 are then returned by the spring 576, the arm 580 imparting return movement to the piston 664.

If at any time during the cycle of operations of the machine it should be desired to stop the operations on the shoe and to cause the shoe to be released, this may be accomplished instantaneously by means of a master switch 670 (Figs. 1 and 24) which controls the electrical circuits of all the solenoids and serves to break any of these circuits which have been closed. This causes such of the valves as have been operated to return at once to their initial positions independently of the cams on the drum 520. It will be understood that in response to such return of the valves any of the parts which have been operated by the fluid are returned to their starting positions by the springs which control them and the pressure in the manifold also is terminated. The drum 520, however, continues its movement until it arrives in its normal stopping position. For thus opening the switch 670 there is provided a knob 672 fast on one end of a curved rod 674 which is guided on the frame of the machine and by lengthwise movement operates one of the switch elements, the switch being opened by pressure applied to the knob.

In the use of the machine it may sometimes be desired, as for test purposes, to stop the machine at the time in the cycle when the wipers are at the limits of their inward wiping movements over the shoe and thereafter to cause the machine to complete its cycle. For this purpose there is associated with the clutch an auxiliary stop comprising a curved leaf spring 676 (Figs. 13 and 14) secured at one end to the previously mentioned stop 548 and having its other end inturned at 678 to adapt it to engage the tail 546 of the pawl 538 and thus to bring the machine to a stop at the desired time. A lug 680 on the spring is connected by a link 682 to one arm of a bell-crank lever 684 pivotally mounted on the casing 528, and extending through an opening in the other arm of this bell-crank lever is one end of a control rod 686 the other end of which extends outwardly through an opening in the frame of the machine. Fast on this rod is a collar 688 engaging the bell-crank lever, and mounted on the outer end of the rod is a knob 690. A latch 692 pivotally mounted on the frame is arranged normally to lie between the frame and the knob 690 and thereby to hold the auxiliary stop in inoperative position. In the operator wishes the machine to come to a stop at the time when the wipers are over the shoe, he swings the latch 692 out of operative position before starting the machine, whereupon the spring 676 by its resiliency assumes such a position as to bring the machine to a stop at the desired time. After the machine has thus come to a stop the operator may start it again to cause it to complete its cycle by pulling on the rod 686 to withdraw the inturned end 678 of the spring 676 from the tail 546 of the pawl. When the operator thus pulls on the rod he swings the latch 692 again into position to hold the auxiliary stop inoperative.

The manner of the normal operation of the machine will now be briefly summarized. Prior to the use of the machine the operator starts the electric motor 424 which drives the pump 422 to cause the pump to deliver fluid from the sump 428 to the manifold 434. At this time, however, the valve 612 (Fig. 12) is in open position to permit return of the fluid to the sump without developing any substantial fluid pressure.

Figure 20:
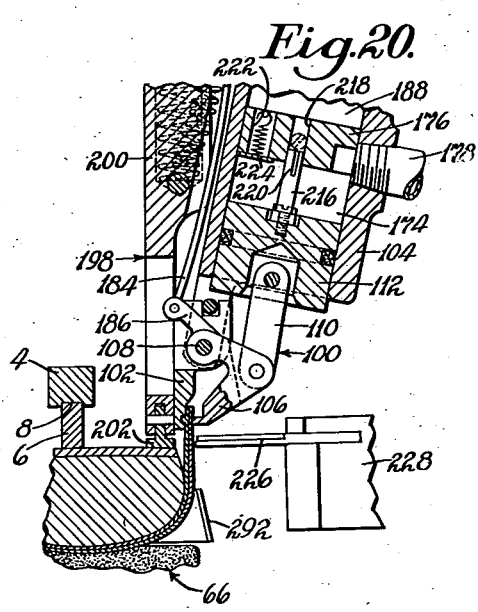
Fig. 20 shows one of the grippers as it appears after it has gripped the upper and pulled it heightwise of the last.

When a shoe comes to the machine it ordinarily will have been lasted along the sides of the forepart beyond the toe portion and also along the sides of its shank portion, as illustrated in Fig. 18. The operator presents the shoe bottom upward with the forepart of the insole in engagement with the block 6 and the leaf spring 20 of the sole rest 2 and moves it forwardly to bring the toe-end face of the last into engagement with the toe former 292 which by reason of its curved shape determines with sufficient accuracy the position of the toe end of the shoe laterally. As the shoe is thus presented the margin of the upper at the sides of the toe is received between the jaws of the open side grippers, as illustrated in Fig. 19. By the pressure of the last against the toe former the U-shaped rod 642 is moved a short distance rearwardly and imparts upward swinging movement to the two arms 648 to raise the rod 652 and thereby to operate the lever 654 which acts on the inclined bar 658 fast on the arm 636 to close the switch 630 (Fig. 24). This causes the solenoid 624 to move the valve 612 into position to close the outlet from the manifold 434 and thus to cause pressure to be developed in the manifold, the excess fluid delivered by the pump thereafter returning to the sump past the relief valve 440 (Fig. 1). In response to the development of fluid pressure the piston 664 (Fig. 16) is operated and swings the arms 580 and 562 in counterclockwise directions to actuate the clutch 534 by movement imparted to the slide 554. In this operation the pawl 568 which engages the block 570 to move the slide slips past the block and thus releases the slide to permit it to be returned by the spring 556. In response to such actuation of the clutch the drum 520 begins its turning movement, and the cam 640 on the drum immediately assumes a position such as to hold the switch 630 closed throughout the cycle of operations regardless of the pressure of the last on the toe former. Substantially at the beginning of the cycle of operations the cam 512 closes the switch 494 and thus causes the valve 466 (Fig. 17) of the valve unit 450 to admit fluid from the manifold to the cylinder 82 to cause the piston 80 to move the toe rest 66 upwardly and thus to clamp the shoe against the sole rest 2. At the same time, under control of the same valve, fluid is admitted to the cylinders 148 (Figs. 4 and 7) to impart outward movements to the grippers until their inner jaws are positioned just beyond the edge of the insole. The cam 514 next becomes effective to close the switch 496 and thus to cause the valve of the valve unit 452 to admit fluid to the gripper cylinders 104, whereupon the pistons 112 are operated to close the grippers on the upper end the pistons 190 are then operated to move the holddowns 198 downwardly into engagement with the margin of the insole and to cause the grippers to move upwardly to pull the upper (Fig. 20).

Figure 21:
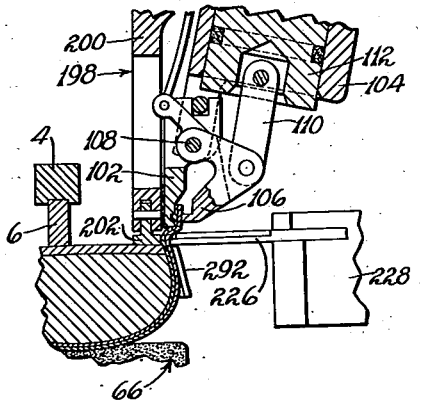
Fig. 21 is a view similar to Fig. 20 with the parts as they appear immediately before the release of the upper by the grippers.
Figure 23:
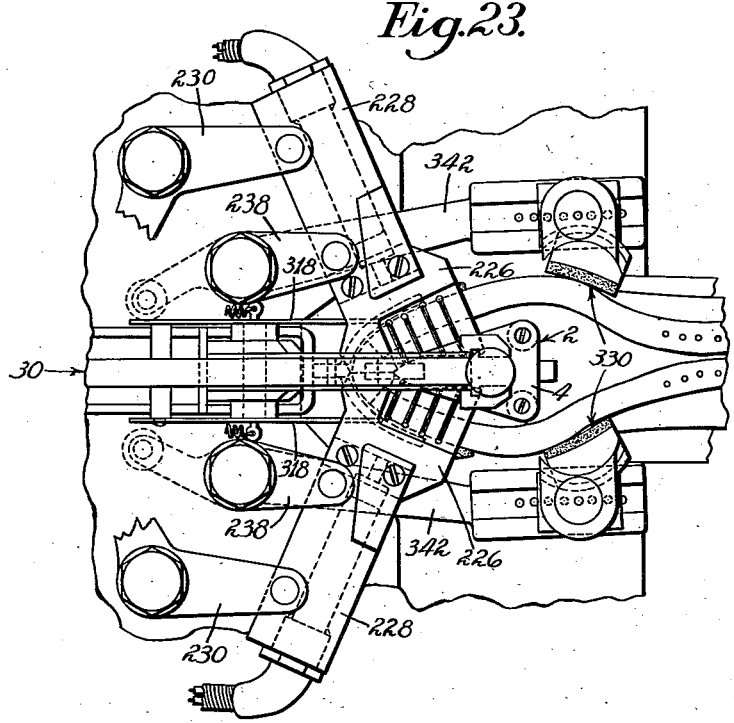
Fig. 23 is a plan view similar to Fig. 18 but with the grippers omitted and with the parts in the same positions as illustrated in Fig. 22.
Figure 22:
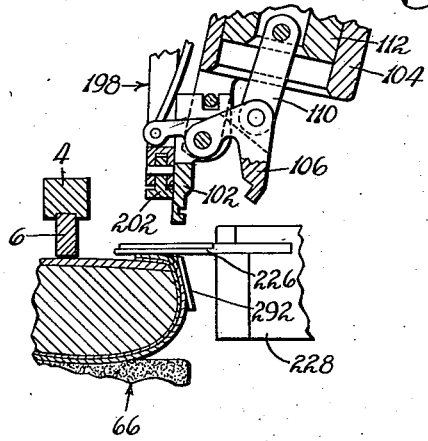
Fig. 22 is a view similar to Fig. 21 with the parts as they appear when the wipers are at the limits of their inward wiping movements over the insole.

After the upper has been pulled by the grippers as above described and while it is held under tension the cam 516 becomes effective to close the switch 498 and thus to cause the valve of the valve unit 454 to admit fluid to the cylinder 268. By the upward movement of the piston 266 in this cylinder several operations are performed in proper time relation to one another, as hereinbefore described, the first operation on the shoe being the wiping of the upper heightwise of the last by the toe former 292 which is moved upwardly by the piston to a position determined by engagement of the finger 312 (Fig. 3) with the stop 314, after which the spring 308 yields to permit further movement of the piston. Simultaneously with the upward movement of the toe former the arm 282 acts through the springs 324 and the levers 322 to move the bars 318 (Fig. 4) forwardly against the toe former and thus to force portions of the latter inwardly against the upper at the sides of the toe while also urging the toe former as a whole lengthwise of the last. By the time the toe former has completed its upward movement the wipers 226, which are operated by the piston 266 through the bell-crank levers 232, arrive in positions to press inwardly against the upper still held by the grippers, as illustrated in Fig. 21, whereupon the cam 514 causes the switch 496 to open. This results in the release of the upper by the grippers which are then moved farther upwardly away from the wipers by the upward movements of the rods 406 acting on the gripper-supporting brackets 132, the holddowns 198 also being moved upwardly clear of the wipers. As the wipers continue their operative movements they wipe the margin of the upper at the sides of the toe inwardly over the insole into position to be secured to the insole by cement previously applied, the wipers being moved inwardly in curved paths with components of movement lengthwise of the shoe in heelward directions. As previously explained, portions of the wipers located farthest from the end of the toe are the first to act on the upper, for better insurance against displacement of portions of the margin of the insole located nearer the end of the toe. Before the wipers complete their inward movements the arm 282 acts on the latch 48 to release the lever 30, whereupon this lever is operated by the spring 46 to raise the sole rest 2 clear of the paths of the wipers. Before the shoe is thus released from control of the sole rest, however, the side clamps 330 are moved inwardly against the shoe by the wedge members 360 (Fig. 8) which are operated yieldingly by the piston 266 through the bell-crank lever 364 and the springs 380. As shown in Fig. 23, the clamp members engage the shoe in locations where its sides curve inward heelwardly of the ball line to render them effective to prevent lengthwise as well as lateral displacement of the shoe. The positions of the parts when the wipers are at the ends of their wiping movements are illustrated in Figs. 22 and 23.

After the completion of the inward movements of the wipers the drum 520 arrives in position to cause the opening of the switches 494 and 498, whereupon the fluid is released from the cylinders 82 and 268 and the parts operated by the pistons in these cylinders are returned to starting positions, the shoe being released and falling on the shoe receiver 420. When the drum arrives in its stopping position, where it is disconnected from the shaft 526 by the clutch 534, the depression 668 (Fig. 15) in its cam 640 is opposite the roll 638 (Fig. 24) on the arm 636, so that the switch 630 opens and causes the valve 612 (Fig. 12) to return to its initial position where it provides a free outlet for the fluid from the manifold 434 to cause the pressure of the fluid to drop substantially to zero. As a result of such drop in the pressure the clutch-controlling arms 562 and 580 (Fig. 16) are returned to their initial positions by the spring 576, ready to be operated by the piston 664 to actuate the clutch again when pressure is developed in the manifold in response to the presentation of the next shoe to the machine.

Having described the invention, what I claim as new and desire to secure by Letters Patent of the United States is:

1. In a shoe machine, overlaying devices movable bodily toward each other to lay the marginal portion of an upper inwardly over an insole on a last from the opposite side edges of the insole respectively, and means for controlling said overlaying devices in their operative movements, said controlling means comprising for each of said devices a pair of arms mounted for swinging movements about different axes extending heightwise of the last and pivotally connected to the corresponding overlaying device in different locations respectively widthwise of the last.

2. In a shoe machine, overlaying devices movable bodily toward each other to lay the marginal portion of an upper inwardly over an insole on a last from the opposite side edges of the insole respectively, levers pivotally connected respectively to said different overlaying devices and mounted for swinging movements about axes extending heightwise of the last thus to operate said devices, and arms also mounted for swinging movements about axes extending heightwise of the last and pivotally connected respectively to the different overlaying devices in different locations widthwise of the last than said levers for further controlling the devices in their operative movements.

3. In a shoe machine, overlaying devices movable bodily toward each other to lay the marginal portion of an upper inwardly over an insole on a last from the opposite side edges of the insole respectively, each of said overlaying devices having associated therewith a pair of arms supporting it respectively in different locations widthwise of the last and mounted for swinging movements about different axes extending heightwise of the last to control it in its operative movement.

4. In a shoe machine, overlaying devices movable bodily toward each other to lay the marginal portion of an upper inwardly over an insole on a last from the opposite side edges of the insole respectively, levers serving respectively as supports for said different overlaying devices and mounted for swinging movements about axes extending heightwise of the last thus to operate said devices, and arms serving further to support said different devices respectively in different locations widthwise of the last than said levers and mounted for swinging movements about axes extending heightwise of the last further to control the devices in their operative movements.

5. In a shoe machine, wipers movable bodily widthwise of a last to wipe the marginal portion of an upper inwardly over an insole on the last from the opposite side edges of the insole respectively, wiper carriers on which said wipers are mounted, levers serving respectively as supports for said different wiper carriers and mounted for swinging movements about axes extending heightwise of the last thus to operate the wipers, and arms further serving respectively to support said carriers in different locations widthwise of the last than said levers and mounted for swinging movements about axes extending heightwise of the last further to control the wipers in their operative movements.

6. In a shoe machine, overlaying devices movable bodily toward each other to lay the marginal portion of an upper inwardly over an insole on a last at the opposite sides of the toe respectively, each of said overlaying devices having associated therewith a pair of arms connected to it respectively in locations at different distances from the last and mounted for swinging movements about axes extending heightwise of the last, said arms being so arranged as to cause the devices to have components of movement lengthwise of the last in heelward directions in operating on the upper.

7. In a shoe machine, overlaying devices movable bodily toward each other to lay the marginal portion of an upper inwardly over an insole on a last at the opposite sides of the toe respectively, levers serving respectively as supports for said different overlaying devices and mounted for swinging movements about axes extending heightwise of the last thus to operate said devices, and arms serving respectively further to support said different devices in locations at different distances from the last than said levers and mounted for swinging movements about axes extending heightwise of the last, said levers and arms being so arranged as to cause said devices to have components of movement lengthwise of the last in heelward directions in operating on the upper.

8. In a shoe machine, wipers movable bodily toward each other to wipe the marginal portion of an upper inwardly over an insole on a last at the opposite sides of the toe respectively, wiper carriers on which said wipers are mounted, levers pivotally connected respectively to said different wiper carriers and mounted for swinging movements about axes extending heightwise of the last thus to operate the wipers, and arms pivotally connected respectively to said carriers in locations at different distances from the last than said levers and mounted for swinging movements about axes extending heightwise of the last, said levers and arms being so arranged as to cause the wipers to have components of movement lengthwise of the last in heelward directions in operating on the upper.

9. In a shoe machine, wipers movable bodily toward each other to wipe the marginal portion of an upper inwardly over an insole on a last at the opposite sides of the toe respectively, wiper carriers on which said wipers are mounted, levers pivotally connected to said wiper carriers and mounted for swinging movements about axes extending heightwise of the last thus to operate the wipers, arms pivotally connected to said carriers in different locations than said levers and mounted for swinging movements about axes extending heightwise of the last further to control the wipers, other arms mounted for swinging movements each about an axis extending widthwise of the last, and links connecting said last-named arms to said levers for imparting the wiper-operating movements to the levers.

10. In a shoe machine, wipers for wiping the marginal portion of an upper inwardly over an insole on a last at the opposite sides of the toe respectively, and supports for said wipers pivotally mounted for swinging movements about axes extending heightwise of the last and spaced apart widthwise of the last to carry the wipers bodily toward each other in curved paths with components of movement lengthwise of the last in heelward directions in thus operating on the upper.

11. In a shoe machine, wipers for wiping the marginal portion of an upper inwardly over an insole on a last at the opposite sides of the toe respectively, and supports for said wipers pivotally mounted for swinging movements about axes extending heightwise of the last and spaced apart widthwise of the last to carry the wipers bodily toward each other in curved paths with components of movement lengthwise of the last in heelward directions in thus operating on the upper, each of said wipers including a plurality of resilient wiping fingers arranged in a series lengthwise of the edge of the shoe bottom in substantially contiguous relation to one another.

12. In a shoe machine, wipers for wiping the marginal portion of an upper inwardly over an insole on a last at the opposite sides of the toe respectively, and means for moving said wipers bodily toward each other in curved paths with components of movement lengthwise of the last in heelward directions thus to operate on the upper, said wipers being so formed and arranged as to cause the portions thereof which are farthest from the end of the toe to begin their wiping action on the upper prior to the portions located nearer the end of the toe.

13. In a shoe machine, overlaying means movable to lay the marginal portion of an upper inwardly over an insole on a last in the course of a cycle of power operations of the machine, automatic means for invariably bringing the machine to a stop at the end of its cycle independently of any control by the machine operator, and additional means stationary during the operation of the machine but optionally movable prior to the starting of the machine into or out of position also to stop it automatically at the time in the cycle when said overlaying means is in engagement with the upper over the insole.

14. In a shoe machine, overlaying means movable to lay the marginal portion of an upper inwardly over an insole on a last in the course of a cycle of power operations of the machine, automatic means for invariably bringing the machine to a stop at the end of its cycle independently of any control by the machine operator, and additional means optionally movable prior to the starting of the machine into or out of position also to stop it automatically at the time in the cycle when said overlaying means is in engagement with the upper over the insole, said additional means being further movable by the operator after the machine has thus been stopped to cause it to complete its cycle.

15. In a shoe machine, overlying means movable to lay the marginal portion of an upper inwardly over an insole on a last in the course of a cycle of power operations of the machine, a clutch arranged to be actuated to start the cycle of operations and rotatable throughout the cycle, said clutch comprising driving and driven elements and a member carried by one of them for connecting or disconnecting them, a device in the path of said member for automatically bringing the machine to a stop at the end of its cycle independently of any control by the machine operator, and another device optionally movable prior to the starting of the machine into the path of said member in position also to stop the machine at the time in the cycle when said overlaying means is in engagement with the upper over the insole.

16. In a shoe machine, a plurality of fluid-operated mechanisms including overlaying means movable to lay the marginal portion of an upper inwardly over an insole on a last in the course of a cycle of operations of the machine, controlling means rotatable to cause the delivery of operating fluid respectively to said different mechanisms in a predetermined order, automatic means for stopping the rotation of said controlling means at the end of the cycle of operations of the machine, and additional means relatively to which said controlling means is thus rotatable for also optionally stopping its rotation automatically at the time in the cycle when said overlaying means is in engagement with the upper over the insole.

17. In a shoe machine, a plurality of fluid-operated mechanisms including overlaying means movable to lay the marginal portion of an upper inwardly over an insole on a last in the course of a cycle of operations of the machine, rotatable cams for controlling the delivery of operating fluid respectively to said different mechanisms, automatic means for stopping the rotation of said cams at the end of the cycle of operations of the machine, and additional means optionally movable prior to the starting of the machine into position also to stop the rotation of said cams at the time in the cycle when said overlaying means is in engagement with the upper over the insole and movable after the cams have thus been stopped to cause them to complete their rotation.

18. In a shoe machine, a plurality of fluid-operated mechanisms including means movable to lay the marginal portion of an upper inwardly over an insole on a last in the course of a cycle of operations of the machine, rotatable cams for controlling the delivery of operating fluid respectively to said different mechanisms, a clutch through which said cams are rotated, automatic means for stopping the rotation of the cams by control of said clutch at the end of the cycle of operations, and additional means optionally movable prior to the starting of the machine into or out of position also to stop the rotation of said cams by control of said clutch at the time in the cycle when said overlaying means is in engagement with the upper over the insole.

19. In a shoe machine, wipers movable to wipe the marginal portion of the toe end of an upper inwardly over an insole on a last, mechanism including a member movable heightwise of the last thus to operate said wipers, a toe former for conforming the toe end of the upper to the contour of the last, and means for moving said toe former heightwise of the last in wiping engagement with the upper by the movement of said wiper-operating member.

20. In a shoe machine, wipers movable to wipe the marginal portion of the toe end of an upper inwardly over an insole on a last, mechanism including a member movable heightwise of the last thus to operate said wipers, a toe former for conforming the toe end of the upper to the contour of the last, and means carried by said wiper-operating member for supporting said toe former and for moving it heightwise of the last in wiping engagement with the upper.

21. In a shoe machine, wipers movable to wipe the marginal portion of the toe end of an upper inwardly over an insole on a last, a member movable heightwise of the last by fluid pressure, connections between said member and the wipers for thus operating the wipers by that movement of said member, and a toe former carried by said member in its movement heightwise of the last for wiping the toe end of the upper in that direction.

22. In a shoe machine, wipers movable to wipe the marginal portion of the toe end of an upper inwardly over an insole on a last, mechanism including a member movable heightwise of the last thus to operate said wipers, a toe former for conforming the toe end of the upper to the contour of the last, and means for moving said toe former heightwise of the last in wiping engagement with the upper by the movement of said wiper-operating member and for completing such movement of the toe former prior to the effective wiping action of the wipers on the upper.

23. In a shoe machine, wipers movable to wipe the marginal portion of the toe end of an upper inwardly over an insole on a last, mechanism including a member movable heightwise of the last thus to operate said wipers, a toe former for conforming the toe end of the upper to the contour of the last, yieldable means for moving said toe former heightwise of the last in wiping engagement with the upper by the movement of said wiper-operating member, and means providing a stop for limiting the movement of the toe former prior to the completion of the wiper-operating movement of said member.

24. In a shoe machine, wipers movable to wipe the marginal portion of the toe end of an upper inwardly over an insole on a last, mechanism including a member movable heightwise of the last thus to operate said wipers, a toe former for conforming the toe end of the upper to the contour of the last, means carried by said wiper-operating member for supporting the toe former and for moving it heightwise of the last in wiping engagement with the upper, said means including a spring yieldable to permit further movement of said member after the movement of the toe former, and means for positively limiting the movement of the toe former.

25. In a shoe machine, wipers movable to wipe the marginal portion of the toe end of an upper inwardly over an insole on a last, mechanism including a member movable heightwise of the last thus to operate said wipers, a flexible toe former constructed and arranged to extend around the toe end of the last for conforming the toe end of the upper to the contour of the last, means for moving said toe former heightwise of the last in wiping engagement with the upper by the movement of said wiper-operating member in that direction, and additional means also operated by said member for pressing the toe former inwardly against the upper.

26. In a shoe machine, wipers movable to wipe the marginal portion of the toe end of an upper inwardly over an insole on a last, mechanism including a member movable heightwise of the last thus to operate said wipers, a flexible toe former constructed and arranged to extend around the toe end of the last for conforming the toe end of the upper to the contour of the last, means for moving said toe former heightwise of the last in wiping engagement with the upper by the movement of said wiper-operating member in that direction, and additional means movable lengthwise of the last by said member for engaging the toe former in locations spaced apart widthwise of that last and for forcing it inwardly against the upper at the sides of the toe.

27. In a shoe machine, the combination with overlaying means movable to lay the margin of the toe end of an upper inwardly over an insole on a last, of a flexible toe former curved to extend around the toe end of the last for conforming the toe end of the upper to the contour of the last and for holding it so conformed during the operation of said overlaying means on the upper, means for moving said toe former heightwise of the last in wiping engagement with the upper, and additional means relatively to which the toe former is thus movable for engaging it and pressing it inwardly against the upper in its movement heightwise of the last.

28. In a shoe machine, the combination with overlaying means movable to lay the margin of the toe end of an upper inwardly over an insole on a last, of a flexible toe former curved to extend around the toe end of the last for conforming the toe end of the upper to the contour of the last and for holding it so conformed during the operation of said overlaying means on the upper, means for moving said toe former heightwise of the last in wiping engagement with the upper, and additional means relatively to which the toe former is thus movable for engaging it and applying pressure thereto lengthwise of the last in locations spaced apart widthwise of the last to force it inwardly against the upper at the sides of the toe.

29. In a shoe machine, the combination with overlaying means movable to lay the margin of the toe end of an upper inwardly over an insole on a last, of a flexible toe former curved to extend around the toe end of the last for conforming the toe end of the upper to the contour of the last and for holding it so conformed during the operation of said overlaying means on the upper, means for moving said toe former heighwise of the last in wiping engagement with the upper, controlling means disconnected from the toe former and relatively to which it is thus movable, said controlling means comprising members arranged to bear against the toe former in locations spaced apart widthwise of the last to force it inwardly against the upper at the sides of the toe, and means for moving said members each independently of the other thus to act on the toe former.

30. In a shoe machine, the combination with overlaying means movable to lay the margin of the toe end of an upper inwardly over an insole on a last, of a flexible toe former curved to extend around the toe end of the last for conforming the toe end of the upper to the contour of the last and for holding it so conformed during the operation of said overlaying means on the upper, means for moving said toe former heightwise of the last in wiping engagement with the upper, controlling means disconnected from the toe former and relatively to which it is thus movable, said controlling means comprising members arranged to apply pressure to the toe former lengthwise of the last in locations spaced apart widthwise of the last to force it inwardly against the upper at the sides of the toe, and means for yieldingly urging said members lengthwise of the last thus to act on the toe former, said members being relatively movable to permit them to assume relative positions in accordance with the contour of the last.

31. In a shoe machine, the combination with overlaying means movable to lay the margin of the toe end of an upper inwardly over an insole on a last, of a flexible toe former curved to extend around the toe end of the last for conforming the toe end of the upper to the contour of the last and for holding it so conformed during the operation of said overlaying means on the upper, means for moving said toe former heightwise of the last in wiping engagement with the upper, controlling means disconnected from the toe former and relatively to which it is thus movable, said controlling means comprising members movable lengthwise of the last and arranged to bear on the toe former in locations spaced apart widthwise of the last to press it against the upper, levers for thus operating said members each independently of the other, and spring means for yieldingly operating said levers.

32. In a shoe machine, a resiliently flexible metal band curved to extend around an end of a last for conforming an upper to the contour of the last, means supporting said band at its intermediate portion, members disconnected from said band but arranged to bear against it in locations spaced apart widthwise of the last to flex it by pressure applied thereto lengthwise of the last and thereby to press it inwardly toward the sides of the last, said members being relatively movable lengthwise of the last to permit them to assume relative positions in accordance with the contour of the last, and means for preventing relative movement of said members widthwise of the last.

33. In a shoe machine, a resiliently flexible metal band curved to extend around an end of a last for conforming an upper to the contour of the last, means supporting said band at its intermediate portion, members disconnected from said band but arranged to bear against it in locations spaced apart widthwise of the last for pressing it inwardly toward the sides of the last, and means for yieldingly urging said members lengthwise only of the last each independently of the other thus to act on said band.

34. In a shoe machine, a resiliently flexible metal band curved to extend around an end of a last for conforming an upper to the contour of the last, means supporting said band at its intermediate portion, members disconnected from said band but arranged to bear against it in locations spaced apart widthwise of the last for pressing it inwardly toward the sides of the last, levers associated respectively with said different members for moving them lengthwise only of the last thus to act on said band while permitting them to move relatively to each other lengthwise of the last, and spring means for yieldingly operating said levers.

35. In a shoe machine, overlaying means movable to lay the marginal portion of an upper inwardly over the forepart of an insole on a last, a sole rest arranged to engage the bottom of the forepart of the insole, a toe rest for engaging the top of the forepart of the shoe, said sole rest and toe resting being relatively movable to clamp the shoe between them for the operation of said overlaying means thereon, means for releasing the shoe from control of the sole rest after the beginning but prior to the completion of the opertive movement of the overlaying means, clamp members for engaging the opposite sides of the shoe in locations between its toe and heel-end portions, and means for moving said clamp members into shoe-engaging positions in the course of the operative movement of the overlaying means further to control the shoe when it is released from control of the sole rest.

36. In a shoe machine, overlaying means movable to lay the marginal portion of an upper inwardly over the forepart of an insole on a last in the course of a cycle of automatic operations of the machine, a sole rest arranged to engage the bottom of the forepart of the insole, a toe rest for engaging the top of the forepart of the shoe, said sole rest and toe rest being relatively movable to clamp the shoe between them for the operation of said overlaying means thereon, means for releasing the shoe from control of the sole rest after the beginning but prior to the completion of the operative movement of the overlaying means, clamp members for engaging the opposite sides of the shoe in locations between its toe and heel-end portions, and means for moving said clamp members into shoe-engaging positions in the course of the cycle of operations of the machine prior to the release of the shoe from control of the sole rest further to control it when it is thus released.

37. In a shoe machine, wipers movable to wipe the marginal portion of an upper inwardly over an insole on a last at the opposite sides of the forepart respectively, a sole rest arranged to engage the bottom of the forepart of the insole to position the shoe as a whole heightwise relatively to said wipers, means for pressing the shoe against said sole rest, means for releasing the shoe from control of the sole rest after the beginning but prior to the completion of the wiping movements of the wipers, clamp members arranged to engage the opposite sides of the shoe in locations between its toe and heel-end portions, and means for moving said clamp members into shoe-engaging positions in automatically determined time relation to the movements of the wipers prior to the release of the shoe from control of the sole rest further to control it when it is thus released.

38. In a shoe machine, overlaying means movable to lay the marginal portion of an upper inwardly over the forepart of an insole on a last, a sole rest arranged to engage the bottom of the forepart of the insole in the path of movement of said overlaying means, means for withdrawing said sole rest heightwise of the shoe from the insole after the beginning but prior to the completion of the operative movement of the overlaying means, clamp members arranged to engage the opposite sides of the shoe in locations between its toe and heel-end portions, and means for moving said clamp members into shoe-engaging positions in the course of the operative movement of the overlaying means prior to such withdrawal of the sole rest further to control the shoe when the sole rest is withdrawn.

39. In a shoe machine, wipers movable bodily toward each other to wipe the marginal portion of an upper inwardly oves an insole on a last at the opposite sides of the toe respectively in the course of a cycle of automatic operations of the machine, a sole rest arranged to engage the bottom of the toe end of the insole in the paths of movement of said wipers to assist in controlling the shoe in the wiping operation, means for withdrawing the sole rest from the insole prior to the completion of the wiping movements of the wipers, clamp members arranged to engage the opposite sides of the shoe respectively, and means for moving said clamp members into shoe-engaging positions in the course of the cycle of operations of the machine further to control the shoe when the sole rest is withdrawn.

40. In a shoe machine, wipers movable to wipe the marginal portion of an upper inwardly over an insole on a last at the opposite sides of the forepart respectively, a sole rest arranged to engage the bottom of the forepart of the insole to position the shoe heightwise relatively to said wipers, means for pressing the shoe against said sole rest, means for releasing the shoe from control of the sole rest after the beginning but prior to the completion of the wiping movements of the wipers, clamp members arranged to engage the opposite sides of the shoe, and means for moving said clamp members widthwise of the shoe into positions determined by the shoe and for locking them positively in those positions in predetermined time relation to the movements of the wipers further to control the shoe when it is released from control of the sole rest.

41. In a shoe machine, the combination with toe-lasting means, of means including a sole rest arranged to engage the bottom of the forepart of a shoe to hold the shoe for the operation of said toe-lasting means thereon, means for releasing the shoe from control of said sole rest prior to the completion of the toe-lasting operation, clamp members arranged to engage the opposite sides of the shoe in locations between its toe and heel-end portions, and means for moving said clamp members widthwise of the shoe into positions determined by the shoe and for locking them positively in those positions prior to the release of the shoe from control of said sole rest further to control it when it is thus released.

42. In a shoe machine, the combination with toe-lasting means, of means including a sole rest arranged to engage the bottom of the forepart of a shoe to hold the shoe for the operation of said toe-lasting means thereon, means for releasing the shoe from control of said sole rest prior to the completion of the toe-lasting operation, clamp members arranged to engage the opposite sides of the shoe in locations where its sides curve inward heelwardly of the ball line, and means for moving said clamp members into shoe-engaging positions in the course of the operation of the machine further to control the shoe when it is released from control of the sole rest.

43. In a shoe machine, the combination with means for lasting the toe end of a shoe in the course of a cycle of automatic operations of the machine, of means including a sole rest arranged to engage the bottom of the forepart of the shoe to hold the shoe for the operation of said toe-lasting means thereon, means for releasing the shoe from control of said sole rest prior to the completion of the toe-lasting operation, clamp members arranged to engage the opposite sides of the shoe in locations where its sides curve inward heelwardly of the ball line, and means for moving said clamp members into positions determined by the shoe and for locking them positively in those positions in the course of the cycle of operations further to control the shoe when it is released from the control of the sole rest.

44. In a shoe machine, the combination with means for operating on a shoe, of clamp members arranged to engage the opposite sides of the shoe respectively to control it as it is thus operated on, supports for said clamp members mounted for swinging movements widthwise of the shoe, wedge members associated respectively with said different supports for thus swinging them widthwise of the shoe to carry the clamp members into shoe-engaging positions, said wedge members being relatively movable to permit them to assume relative positions determined by the positions of the clamp members in engagement with the shoe, and means including springs associated respectively with the different wedge members for yieldingly operating them.

45. In a shoe machine, the combination with means for operating on a shoe, of clamp members arranged to engage the opposite sides of the shoe respectively to control it as it is thus operated on, levers supporting said clamp members and mounted for swinging movements to carry the clamp members into shoe-engaging positions, and wedge members associated respectively with said different levers and movable thus to swing the levers, said wedge members being relatively movable to permit them to assume relative positions determined by the positions of the clamp members in engagement with the shoe.

46. In a shoe machine, the combination with means for operating on a shoe, of clamp members arranged to engage the opposite sides of the shoe respectively to control it as it is thus operated on, levers supporting said clamp members and mounted for swinging movements each about an axis extending heightwise of the shoe to carry the clamp members into shoe-engaging positions, and wedge members associated respectively with said different levers and movable lengthwise of the shoe thus to swing said levers.

47. In a shoe machine, the combination with means for operating on a shoe, of clamp members arranged to engage the opposite sides of the shoe respectively to control it as it is thus operated on, levers supporting said clamp members and mounted for swinging movements to carry the clamp members into positions determined by the shoe, and wedge members associated respectively with said different levers and movable thus to swing said levers, said wedge members being so formed as to hold the levers positively against reverse movements from any positions.

48. In a shoe machine, wipers movable bodily toward each other to wipe the marginal portion of an upper inwardly over an insole on a last at the opposite sides of the toe respectively, a sole rest arranged to engage the toe end of the insole in the paths of movement of said wipers widthwise of the shoe to determine the position of the shoe heightwise, and automatic means for withdrawing the sole rest heightwise of the shoe from engagement with the insole and for thereby releasing the shoe to permit it to be pressed more forcibly against the wipers after the wipers have begun to wipe the upper inwardly over the insole and for moving it out of the path of the wipers prior to the completion of their wiping movements.

49. In a shoe machine, wipers movable bodily toward each other to wipe the marginal portion of an upper inwardly over an insole on a last at the opposite sides of the toe respectively, a sole rest arranged to engage the toe end of the insole in the paths of movement of said wipers widthwise of the shoe to position the shoe heightwise relatively to the wipers, said sole rest being mounted for movement heightwise of the shoe in a direction away from the insole, a device for holding the sole rest initially against such movement, means for moving said device to release the sole rest in predetermined time relation to the movements of the wipers, and spring means for moving the sole rest away from the insole to clear the wipers when it is thus released.

50. In a shoe machine, wipers for wiping the marginal portion of an upper inwardly over an insole on a last at the opposite sides of the toe respectively, said wipers being movable bodily toward each other widthwise of the last into substantially contiguous relation to each other over the insole, a sole rest arranged to engage the toe end of the insole substantially midway between the opposite side edges of the insole in a location where the wipers thus assume a substantially contiguous relation to position the shoe heightwise relatively to the wipers, and automatic means for moving said sole rest heightwise of the shoe away from the insole to clear the wipers after the wipers have begun to wipe the upper inwardly over the insole but prior to the completion of their wiping movements.

51. In a shoe machine, overlaying means movable to lay the marginal portion of an upper inwardly over an insole on a last, a sole rest arranged to engage the insole in the path of movement of said overlaying means, said sole rest being supported for movement heightwise of the shoe in a direction away from the insole, means for thus moving the sole rest, a latch for holding the sole rest initially against such movement, and a member movable in one direction in predetermined time relation to the movement of the overlaying means to cause the latch to release the sole rest and movable thereafter in the opposite direction to return the sole rest into position to be held by the latch.

52. In a shoe machine, members movable to lay the marginal portion of an upper inwardly over an insole on a last from the opposite side edges of the insole respectively, a sole rest arranged to engage the insole in the paths of movement of said overlaying members, a lever supporting said sole rest and mounted for swinging movement about an axis extending widthwise of the shoe to permit movement of the sole rest in a direction heightwise of the shoe away from the insole, means for thus swinging said lever, a latch for holding the lever initially against such movement, and a member movable in one direction at a predetermined time in the operation of the machine to cause the latch to release the lever and movable thereafter in the opposite direction to return the lever into position to be held by the latch.

53. In a shoe machine, a sole rest arranged to engage the bottom face of the insole of a shoe on a last to control the shoe, said sole rest including a plurality of insole-engaging projections having therein recesses opposite the insole formed to provide around the recesses continuous curved edge portions arranged to embed themselves in the insole to hold the shoe against displacement in the course of the operation of the machine.

54. In a shoe machine, a sole rest arranged to engage the bottom face of the forepart of the insole of a shoe on a last to position the shoe relatively to means for performing an operation thereon, said sole rest including a plurality of insole-engaging projections having therein recesses opposite the insole to provide around the recesses circular edge portions arranged to embed themselves in the insole to hold the shoe against displacement in the course of the operation of the machine, and means for pressing the shoe against said projections by engagement with the top of its forepart after it has been presented to the machine.

55. In a shoe machine, a sole rest arranged to engage the bottom face of the forepart of the insole of a shoe on a last while the shoe is supported by the operator in presenting it to the machine to position the shoe relatively to means for performing an operation thereon, said sole rest including a plurality of insole-engaging projections having therein recesses opposite the insole to provide around the recesses edge portions arranged to embed themselves in the insole to hold the shoe against displacement in the course of the operation of the machine, and means for engaging the forepart of the insole to guide the shoe as it is presented to the machine while holding it normally out of contact with said projections, said means being yieldable to permit the shoe to be forced against the projections after it has thus been presented.

56. In a shoe machine, a sole rest arranged to engage the bottom face of the forepart of the insole of a shoe on a last while the shoe is supported by the operator in presenting it to the machine to position the shoe relatively to means for performing an operation thereon, said sole rest having a plurality of insole-engaging projections for holding the shoe against displacement in the course of the operation of the machine, and means for engaging the forepart of the insole substantially midway between its opposite side edges to guide the shoe as it is presented to the machine while holding it normally out of contact with said projections, said means comprising a leaf spring yieldable to permit the shoe to be forced against the projections after it has thus been presented.

57. In a shoe machine, power-operated means for performing a lasting operation on the toe end of an upper mounted on a last, a toe former for conforming the toe end of the upper to the contour of the last, said toe former being so mounted as to be moved by pressure of the last thereon, and means movable by the toe former for rendering said power-operated means thus operative in response to pressure applied by the last to the toe former when the shoe is presented to the machine.

58. In a shoe machine, power-operated means for performing a lasting operation on the toe end of an upper mounted on a last in the course of a cycle of operations of the machine, a toe former constructed and arranged to embrace the toe end of the last and to conform the toe end of the upper to the contour of the last, said toe former being mounted for movement in a direction lengthwise of the last in response to pressure applied thereto by the last in the presentation of the shoe to the machine, and means for starting the cycle of operations by such movement of the toe former.

59. In a shoe machine, power-operated means for performing a lasting operation on the toe end of an upper mounted on a last in the course of a cycle of operations of the machine, a toe former for conforming the toe end of the upper to the contour of the last, means for moving said toe former heightwise of the last in wiping contact with the upper also in the course of the cycle of operations, and means for starting the cycle of operations in response to pressure applied by the last to the toe former when the shoe is presented to the machine.

60. In a shoe machine, power-operated means for performing a lasting operation on the toe end of an upper mounted on a last in the course of a cycle of operations of the machine, a toe former for conforming the toe end of the upper to the contour of the last, a clutch arranged to be actuated to start the cycle of operations, and means for thus actuating said clutch in response to pressure applied by the last to the toe former when the shoe is presented to the machine.

61. In a shoe machine, power-operated means for performing a lasting operation on the toe end of an upper mounted on a last in the course of a cycle of operations of the machine, a toe former for conforming the toe end of the upper to the contour of the last, fluid-operated means for starting the cycle of operations, and electrically operated means for rendering said fluid-operated means thus operative in response to pressure applied by the last to the toe former when the shoe is presented to the machine.

62. In a power-operated machine, power-operated means for operating on work in a cycle of operations of the machine, a clutch arranged to be tripped to start the cycle of operations, a pump for normally circulating fluid without developing any substantial fluid pressure, a valve movable to obstruct such circulation of the fluid and thereby to cause the development of fluid pressure in response to presentation of the work to the machine, a cylinder in constantly open communication with the fluid circuit, and a piston in said cylinder, said piston and cylinder being relatively movable to trip said clutch and thus to start the cycle of operations in response to the development of the fluid pressure.

63. In a power-operated machine, power-operated means for operating on work in a cycle of operations of the machine, an electrical switch arranged to be closed in response to presentation of the work to the machine, means for starting the cycle of operations in response to the closing of said switch, and a cam movable substantially at the beginning of the cycle after the switch has been closed into position to hold it closed until the end of the cycle.

64. In a power-operated machine, power-operated means for operating on work in a cycle of operations of the machine, a clutch arranged to be actuated to start the cycle of operations, an electrical switch arranged to be closed in response to presentation of the work to the machine, means for thus actuating said clutch in response to the closing of said switch, and means movable substantially at the beginning of the cycle into position to hold said switch closed independently of the work.

65. In a power-operated machine, power-operated means for operating on work in a cycle of operations of the machine, a pump for normally circulating fluid without developing any substantial fluid pressure, an electrical switch arranged to be closed in response to presentation of the work to the machine, means to cause the development of fluid pressure in response to the closing of said switch, means for starting the cycle of operations in response to the development of such fluid pressure, and means movable substantially at the beginning of the cycle into position to hold said switch closed until the end of the cycle.

66. In a power-operated machine, a plurality of power-operated means for operating successively on work in a cycle of operations of the machine, a plurality of rotatable cams for controlling the operations of said power-operated means in sequence, a fluid-actuated clutch through which said cams are rotated, and means for developing fluid pressure to actuate said clutch and thereby to start a cycle of operations in response to presentation of the work to the machine.

67. In a fluid-operated machine, fluid-operated means for operating on work in a cycle of operations of the machine, a pump for supplying operating fluid to said fluid-operated means, means providing an outlet for fluid delivered by said pump to prevent the development of any substantial fluid pressure when there is no work in the machine, means for obstructing said outlet to cause the development of such fluid pressure in response to presentation of the work to the machine, and means for automatically starting the cycle of operations in response to the development of such fluid pressure.

68. In a fluid-operated machine, fluid-operated means for operating on work in a cycle of operations of the machine, a pump for supplying operating fluid to said fluid-operated means, a valve arranged to permit the escape of fluid delivered by said pump to prevent the development of any substantial fluid pressure when the valve is open, electrically operated means movable in response to presentation of the work to the machine to close said valve and thereby to cause the development of such fluid pressure, and fluid-operated means for starting the cycle of operations in response to the development of such fluid pressure.

69. In a fluid-operated machine, fluid-operated means for operating on work in a cycle of operations of the machine, a pump for supplying operating fluid to said fluid-operated means, a valve arranged to permit the escape of fluid delivered by said pump to prevent the development of any substantial fluid pressure when there is no work in the machine, an electromagnetic device for closing said valve to cause the development of such fluid pressure in response to presentation of the work to the machine, a clutch arranged to be actuated to start the cycle of operations of the machine, and fluid-operated means for thus actuating said clutch automatically in response to the development of such fluid pressure.

70. In a fluid-operated machine, a plurality of fluid-operated mechanisms for operating on work in a cycle of operations of the machine, a pump for normally circulating operating fluid without developing any substantial fluid pressure, means for obstructing such circulation of the fluid to cause the development of fluid pressure for operating said mechanisms, and means for automatically starting the cycle of operations in response to the development of such fluid pressure.

71. In a fluid-operated machine, a plurality of fluid-operated mechanisms for operating on work in a cycle of operations of the machine, a pump for normally circulating operating fluid without developing any substantial fluid pressure, means for obstructing such circulation of the fluid to cause the development of fluid pressure for operating said mechanisms, a clutch arranged to be actuated to start the cycle of operations, and fluid-operated means for thus actuating said clutch in response to the development of such fluid pressure.

72. In a fluid-operated machine, a plurality of fluid-operated mechanisms for operating on work in a cycle of operations of the machine, controlling means rotatable to cause the delivery of operating fluid to said mechanisms in a predetermined order, means to cause the development of fluid pressure for operating said mechanisms in response to presentation of the work to the machine, and mechanism for automatically starting the operation of said controlling means in response to the development of such fluid pressure.

73. In a fluid-operated machine, a plurality of fluid-operated mechanisms for operating on work in a cycle of operations of the machine, a plurality of cams for controlling the delivery of operating fluid respectively to said different mechanisms, a clutch through which said cams are rotated, means to cause the development of fluid pressure for operating said mechanisms in response to presentation of the work to the machine, and means for automatically actuating said clutch to start the cycle of operations in response to the development of such fluid pressure.

74. In a fluid-operated machine, a plurality of fluid-operated mechanisms for operating on work in a cycle of operations of the machine, a manifold from which fluid is supplied to operate said mechanisms, a pump for delivering fluid to said manifold, means including a rotatable member provided with cams for controlling the delivery of fluid respectively to said different mechanisms, a clutch through which said member is operated, a valve arranged to permit the escape of fluid delivered by said pump to prevent the development of any substantial fluid pressure in the manifold when the valve is open, means for closing said valve to cause the development of such fluid pressure in response to presentation of the work to the machine, and fluid-operated means for actuating said clutch to start the cycle of operations in response to the development of such fluid pressure.

75. In a fluid-operated machine, a plurality of fluid-operated mechanisms for operating on work in a cycle of operations of the machine, a manifold from which fluid is supplied to operate said mechanisms, a pump for delivering fluid to said manifold, a plurality of cams for controlling the delivery of fluid respectively to said different mechanisms, a clutch through which said cams are rotated, a valve arranged to permit the escape of fluid delivered by said pump to prevent the development of any substantial fluid pressure in the manifold when the valve is open, means for closing said valve to cause the development of such fluid pressure in response to presentation of the work to the machine, a cylinder in constantly open communication with said manifold, and a piston in said cylinder arranged to actuate said clutch automatically to start the cycle of operations in response to the development of such fluid pressure.

76. In a fluid-operated machine, a fluid-operated means for operating on work presented to the machine, a pump for supplying operating fluid to said fluid-operated means, means providing an outlet for fluid delivered by said pump to prevent the development of any substantial fluid pressure when there is no work in the machine, and means controlled by work presented to the machine for obstructing said outlet to cause the development of such fluid pressure.

77. In a fluid-operated machine, fluid-operated means for operating on work presented to the machine, a pump for supplying operating fluid to said fluid-operated means, a valve arranged to permit the escape of fluid delivered by said pump to prevent the development of any substantial fluid pressure when the valve is open, and means for closing said valve to cause the development of such fluid pressure in response to presentation of the work to the machine.

78. In a fluid-operated machine, fluid-operated means for operating on work presented to the machine, a pump for supplying operating fluid to said fluid-operated means, means providing an outlet for fluid delivered by said pump to prevent the development of any substantial fluid pressure when there is no work in the machine, and electrically operated means movable in response to presentation of the work to the machine to obstruct said outlet and thereby to cause the development of such fluid pressure.

79. In a fluid-operated machine, fluid-operated means for operating on work presented to the machine, a pump for supplying operating fluid to said fluid-operated means, a valve arranged to permit the escape of fluid delivered by said pump to prevent the development of any substantial fluid pressure when there is no work in the machine, an electromagnetic device for closing said valve to cause the development of such fluid pressure, and a switch controlled by work in the machine for closing the electrical circuit of said device.

80. In a fluid-operated machine, a plurality of fluid-operated mechanisms for operating on work presented to the machine, a manifold from which fluid is supplied to operate said mechanisms, a pump for delivering fluid to said manifold, a valve arranged to permit the escape of fluid delivered by said pump to prevent the development of any substantial fluid pressure in the manifold when the valve is open, and an electromagnetic device for closing said valve to cause the development of such fluid pressure in response to presentation of the work to the machine.

81. In a fluid-operated machine, fluid-operated means for operating on work in a cycle of operations of the machine, a pump for supplying operating fluid to said fluid-operated means, means providing an outlet for fluid delivered by said pump to prevent the development of any substantial fluid pressure when there is no work in the machine, means for obstructing said outlet to cause the development of such fluid pressure in response to presentation of the work to the machine, and means movable substantially at the beginning of the cycle of operations into position to cause said outlet to remain thus obstructed independently of the work until the end of the cycle.

82. In a fluid-operated machine, fluid-operated means for operating on work in a cycle of operations of the machine, a pump for normally circulating operating fluid without developing any substantial fluid pressure, an electrical switch arranged to be closed in response to presentation of the work to the machine, means to cause the development of fluid pressure in response to the closing of said switch, and means movable substantially at the beginning of the cycle of operations into position to hold said switch closed independently of the work until the end of the cycle.

83. In a fluid-operated machine, a plurality of fluid-operated mechanisms for operating on work in a cycle of operations of the machine, a pump for normally circulating operating fluid without developing any substantial fluid pressure, an electrical switch arranged to be closed in response to presentation of the work to the machine, means to cause the development of fluid pressure in response to the closing of said switch, a plurality of cams rotatable in the cycle of operations to control the delivery of operating fluid to said different mechanisms, and another rotatable cam for holding said switch closed independently of the work until the end of the cycle.

84. In a fluid-operated machine, a plurality of fluid-operated mechanisms for operating on work presented to the machine, valves for admitting operating fluid respectively to said different mechanisms, electromagnetic devices associated respectively with said different valves to cause them thus to admit the fluid, and power-operated members rotatable as a unit with an automatically terminable movement for closing respectively the electrical circuits of said devices in a predetermined sequence and for thereby causing said fluid-operated mechanisms to receive operating fluid at different times respectively in a cycle of operations of the machine.

85. In a fluid-operated machine, a plurality of fluid-operated mechanisms for operating on work presented to the machine, valves for admitting operating fluid respectively to said different mechanisms, electromagnetic devices associated respectively with said different valves to cause them thus to admit the fluid, a power-operated rotatable member provided with means for closing the electrical circuits of said devices in a predetermined sequence and for thereby causing said fluid-operated mechanisms to receive operating fluid respectively at different times, a clutch through which said rotatable member is operated, and automatic means for controlling said clutch to stop the rotation of said member at the end of a cycle of operations of the machine.

86. In a fluid-operated machine, a plurality of fluid-operated mechanisms for operating on work presented to the machine, valves for admitting operating fluid respectively to said different mechanisms, electromagnetic devices associated respectively with said different valves to cause them thus to admit the fluid, switches for closing the electrical circuits of said devices to energize them, power-operated cams for operating said switches respectively in such order as to cause said fluid-operated mechanisms to receive operating fluid respectively at different times, and automatic means for stopping the operation of said cams at the end of a cycle of operations of the machine.

87. In a fluid-operated machine, a plurality of fluid-operated mechanisms for operating on work presented to the machine, valves for admitting operating fluid respectively to said different mechanisms, electromagnetic devices associated respectively with said different valves to cause them thus to admit the fluid, switches for closing the electrical circuits of said devices to energize them, a rotatable member having thereon cams for operating said switches respectively in such order as to cause said fluid-operated mechanisms to receive operating fluid respectively at different times, a clutch through which said member is operated, and automatic means for controlling said clutch to stop the rotation of said member at the end of a cycle of operations of the machine.

88. In a fluid-operated machine, a plurality of fluid-operated mechanisms for operating on work in the course of a cycle of operations of the machine, controlling means rotatable to cause the delivery of operating fluid to said different mechanisms in a predetermined order, automatic means for stopping the rotation of said controlling means at the end of the cycle of operations of the machine, and additional means relatively to which said controlling means is thus rotatable for optionally stopping its rotation automatically at a predetermined time prior to the end of the cycle.

89. In a fluid-operated machine, a plurality of fluid-operated mechanisms for operating on work in the course of a cycle of operations of the machine, controlling means rotatable to cause the delivery of operating fluid to said different mechanisms in a predetermined order, automatic means for stopping the rotation of said controlling means at the end of the cycle of operations of the machine, and additional means stationary during the operation of the machine but optionally movable prior to the starting of the machine into or out of position to stop the rotation of said controlling means at a predetermined time prior to the end of the cycle.

90. In a fluid-operated machine, a plurality of fluid-operated mechanisms for operating on work in the course of a cycle of operations of the machine, rotatable cams for controlling the delivery of operating fluid respectively to said different mechanisms, automatic means for stopping the rotation of said cams at the end of the cycle of operations of the machine, and additional means optionally movable prior to the starting of the machine into position to stop the rotation of said cams at a predetermined time prior to the end of the cycle, said additional means being further movable after the cams have thus been stopped to cause them to complete their rotation.

91. In a fluid-operated machine, a plurality of fluid-operated mechanisms for operating on work in the course of a cycle of operations of the machine, rotatable cams for controlling the delivery of operating fluid respectively to said different mechanisms, a clutch through which said cams are rotated, automatic means for stopping the rotation of the cams by control of said clutch at the end of the cycle of operations, and additional means optionally movable prior to the starting of the machine into or out of position to stop the rotation of said cams by control of said clutch prior to the end of the cycle.

BERNHARDT JORGENSEN.

REFERENCES CITED

The following references are of record in the file of this patent:

UNITED STATES PATENTS

| Number | Name | Date |
|---|---|---|
| 389,275 | Woodward | Sept. 11, 1888 |
| 704,098 | Pickles | July 8, 1902 |
| 946,708 | Snow | Jan. 18, 1910 |
| 1,047,387 | Cook | Dec. 17, 1912 |
| 1,082,704 | Parmentier | Dec. 30, 1913 |
| 1,095,266 | Brown | May 5, 1914 |
| 1,129,047 | Simmons | Feb. 16, 1915 |
| 1,490,977 | Jorgensen | Apr. 22, 1924 |
| 1,634,327 | Kennedy | July 5, 1927 |
| 1,692,771 | Ferris | Nov. 20, 1928 |
| 1,710,735 | Jorgensen | Apr. 30, 1929 |
| 1,745,451 | Pym | Feb. 4, 1930 |
| 1,979,479 | Leland | Nov. 6, 1934 |
| 2,033,245 | Jorgensen | Mar. 10, 1936 |
| 2,065,820 | Mellon | Dec. 29, 1936 |
| 2,169,747 | Treer | Aug. 15, 1939 |
| 2,193,395 | Dewey, Jr. | Mar. 12, 1940 |
| 2,205,861 | Oussani | June 25, 1940 |
| 2,271,717 | Swartz | Feb. 3, 1942 |
| 2,324,509 | Jorgensen | July 20, 1943 |
| 2,339,774 | Eppler, Jr. | Jan. 25, 1944 |
| 2,352,183 | Bullard, 3d | June 27, 1944 |
| 2,371,358 | Sekella | Mar. 13, 1945 |
| 2,387,331 | Jorgensen | Oct. 23, 1945 |
| 2,444,141 | Miller | June 29, 1948 |